US012754591B2

(12) United States Patent

Zhang et al.

(10) Patent No.: US 12,754,591 B2
(45) Date of Patent: Oct. 6, 2026

(54) FOLDABLE ELECTRONIC DEVICE

(71) Applicant: HUAWEI TECHNOLOGIES CO., LTD., Shenzhen (CN)

(72) Inventors: Haiqin Zhang, Shenzhen (CN); Lexiong Peng, Dongguan (CN); Wen Fan, Dongguan (CN); Ding Zhong, Dongguan (CN); Tao Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 74 days.

(21) Appl. No.: 18/892,552

(22) Filed: Sep. 23, 2024

(65) Prior Publication Data

US 2025/0013271 A1 Jan. 9, 2025

Related U.S. Application Data

(63) Continuation of application No. PCT/CN2023/084500, filed on Mar. 28, 2023.

(30) Foreign Application Priority Data

Mar. 31, 2022 (CN) ........................ 202210334479.7

(51) Int. Cl.
*G06F 1/16* (2006.01)

(52) U.S. Cl.
CPC .......... *G06F 1/1681* (2013.01); *G06F 1/1641* (2013.01); *G06F 1/1652* (2013.01)

(58) Field of Classification Search
CPC .... G06F 1/1681; G06F 1/1652; G06F 1/1641; H04M 1/0268; H04M 1/0216; H04M 1/02; H05K 5/0226
See application file for complete search history.

(56) References Cited

U.S. PATENT DOCUMENTS 10,599,189 B1 * 3/2020 Hsu ........................ G06F 1/1681
12,038,792 B2 * 7/2024 Feng ..................... G06F 1/1681
(Continued)

FOREIGN PATENT DOCUMENTS

CN 209402552 U 9/2019
CN 110493388 A 11/2019
(Continued)

OTHER PUBLICATIONS

Machine Translation for CN211209736U (Year: 2026).*
Machine Translation for WO2021007912A (Year: 2026).*

*Primary Examiner* — Sagar Shrestha
*Assistant Examiner* — Peter Krim

(57) ABSTRACT

A foldable electronic device has a first housing, a second housing, a central shaft assembly, and two shielding members. In a first direction, the first housing and the second housing are respectively connected to two opposite sides of the central shaft assembly. Each shielding member includes a first shielding body, a second shielding body, and a third shielding body. The second shielding body and the third shielding body are located at two opposite sides of the first shielding body. In a second direction, the second shielding body is located at a side of the first shielding body facing the central shaft assembly and is partially stacked with the first shielding body, and the third shielding body is located at the side of the first shielding body facing the central shaft assembly and is partially stacked with the first shielding body.

12 Claims, 9 Drawing Sheets

(56) References Cited

U.S. PATENT DOCUMENTS

| | | | |
|---|---|---|---|
| 2021/0165466 | A1 | 6/2021 | Kang et al. |
| 2022/0019270 | A1 | 1/2022 | Su et al. |

FOREIGN PATENT DOCUMENTS

| | | | | | |
|---|---|---|---|---|---|
| CN | 211209736 | U | * | 8/2020 | |
| CN | 112235440 | A | | 1/2021 | |
| CN | 113534890 | A | | 10/2021 | |
| CN | 113949757 | A | | 1/2022 | |
| CN | 114067672 | A | | 2/2022 | |
| CN | 114070909 | A | | 2/2022 | |
| JP | 2010050931 | A | | 3/2010 | |
| JP | 2010218102 | A | | 9/2010 | |
| JP | 2021513237 | A | | 5/2021 | |
| JP | 2023528336 | A | | 7/2023 | |
| TW | 202200914 | A | | 1/2022 | |
| WO | WO-2021007912 | A1 | * | 1/2021 | .......... H04M 1/0268 |
| WO | 2021238651 | A1 | | 12/2021 | |
| WO | 2022037375 | A1 | | 2/2022 | |

* cited by examiner

FOLDABLE ELECTRONIC DEVICE

CROSS-REFERENCE TO RELATED APPLICATIONS

This application is a continuation of International Application PCT/CN2023/084500, filed on Mar. 28, 2023, which claims priority to Chinese Patent Application 202210334479.7, filed on Mar. 31, 2022. The disclosures of the aforementioned applications are hereby incorporated by reference in their entirety.

TECHNICAL FIELD

This application relates to the electronic field, and in particular, to a foldable electronic device.

BACKGROUND

At present, foldable electronic devices are increasingly popular in the market. Take a foldable smartphone characterized by a flexible and bendable screen as an example. After the screen is bent, a dimension of the screen is similar to that of a common smartphone, and the foldable smartphone with the bent screen is easy to carry and use. After the screen is unfolded, a dimension of the screen is similar to that of a tablet computer, and entertainment or office functions are convenient to use on the unfolded screen. The foldable smartphone has advantages of the electronic device and the tablet computer, thereby meeting current consumer's needs. However, the bendable screen is more likely to break because of its large area and frequent folding activities. Therefore, screen protection is very important. Locations at which the foldable electronic device is most vulnerable to damage are end parts of a folded part of the screen. Therefore, how to effectively increase strength of the end parts of the folded part becomes a problem that cannot be avoided by the foldable electronic device.

SUMMARY

An objective of this application is to provide a foldable electronic device with a high-strength end part appearance shielding member.

According to a first aspect, this application provides a foldable electronic device, including a first housing, a second housing, a central shaft assembly, and two shielding members. In a first direction, the first housing and the second housing are respectively connected to two opposite sides of the central shaft assembly, and the central shaft assembly implements relative rotation of the first housing and the second housing. Each shielding member includes a first shielding body, a second shielding body, and a third shielding body. The second shielding body and the third shielding body are located at two opposite sides of the first shielding body, and both the second shielding body and the third shielding body are capable of rotating relative to the first shielding body. In a second direction, the second shielding body is located at a side that is of the first shielding body and that faces the central shaft assembly and is partially stacked with the first shielding body, and the third shielding body is located at the side that is of the first shielding body and that faces the central shaft assembly and is partially stacked with the first shielding body.

In the second direction, the two shielding members are respectively located at two opposite ends of the central shaft assembly, the first shielding body is connected to one end part of the central shaft assembly, and the second shielding body is capable of sliding and rotating relative to the first housing, the third shielding body is capable of sliding and rotating relative to the second housing. The first shielding body, the second shielding body, and the third shielding body form a part of an appearance structure of the foldable electronic device. The first direction is perpendicular to the second direction.

In this embodiment of this application, the first shielding body, the second shielding body, and the third shielding body may jointly form the part of the appearance structure of the foldable electronic device. Because the second shielding body and the third shielding body are partially stacked with the first shielding body, that is, there are overlapping parts, and do not directly bear impact payloads, an impact payload on the first shielding body may be decomposed to the first housing and the second housing on two sides, to protect internal components. A possibility of dislocation between the first shielding body, the second shielding body, and the third shielding body is reduced, thereby improving structural stability of the foldable electronic device. In addition, the first shielding body, the second shielding body, and the third shielding body may shield internal components of space in which the central shaft assembly is located, so that an appearance of the foldable electronic device is more exquisite. The shielding members are respectively located at the two ends of the central shaft assembly, and may further provide uniform shielding effect for the two ends of the central shaft assembly, so that the appearance of the foldable electronic device is more concise.

In a possible implementation, appearance surfaces of the first shielding body, the second shielding body, and the third shielding body jointly form an appearance surface of the appearance structure. The appearance surface of the appearance structure faces a same direction as some appearance surfaces of the first housing and the second housing. The appearance surfaces of the second shielding body and the third shielding body are respectively located in a gap between the first shielding body and the first housing and a gap between the first shielding body and the second housing.

In an unfolded state of the foldable electronic device, the first housing and the second housing are flattened relative to each other, and the first housing, the second shielding body, the first shielding body, the third shielding body, and the second housing are sequentially arranged in the first direction. In a folded state of the foldable electronic device, the first housing and the second housing are oppositely folded, and the second shielding body and the third shielding body separately rotate by a specific angle relative to the first shielding body.

It may be understood that, in the unfolded state of the foldable electronic device, the first shielding body, the second shielding body, and the third shielding body may cover the gaps of the first housing and the second housing, so that end surfaces of a folding position of the foldable electronic device in the unfolded state is covered by the shielding members, thereby protecting the internal components and simplifying an appearance structure of the foldable electronic device. In the folded state of the foldable electronic device, the first shielding body, the second shielding body, and the third shielding body may rotate relative to each other as the central shaft assembly rotates, to complete coverage and protection of a folded central shaft end surface, and may bend at an angle as the first housing and the second housing are oppositely folded.

In a possible implementation, the first shielding body includes a main shielding body and a limiting body that is connected to the central shaft assembly. The limiting body is convexly disposed on a side surface of the main shielding body, limiting blocks are disposed on two opposite sides of the limiting body, and the second shielding body and the third shielding body are respectively located at the two opposite sides of the limiting body. The second shielding body is partially stacked with the main shielding body, and the third shielding body is partially stacked with the first shielding body. Two opposite sides of the second shielding body respectively face and have rotation gaps with a side surface of the limiting body and an end surface of the first housing, and two opposite sides of the third shielding body respectively face and have rotation gaps with the other side surface of the limiting body and an end surface of the second housing.

It may be understood that there is a rotation gap between one side of the second shielding body and the limiting body of the first shielding body, and the other side of the second shielding body is spaced opposite to an end part of the first housing. There is a rotation gap between one side of the third shielding body and the limiting body of the first shielding body, and the other side of the third shielding body is spaced opposite to an end part of the second housing. The second shielding body may rotate relative to the first housing and the first shielding body that are adjacent to each other when the foldable electronic device folds or unfolds, and the third shielding body may rotate relative to the second housing and the first shielding body that are adjacent to each other when the foldable electronic device folds or unfolds, so that the first housing, the second shielding body, the first shielding body, the third shielding body, and the second housing may sequentially rotate relative to each other and may sequentially limit each other. Therefore, a structure of the foldable electronic device in use is stable and not easily damaged.

In a possible implementation, the two opposite sides of the limiting body include concave curved surfaces, the second shielding body includes two arc-shaped convex surfaces that are oppositely disposed, and the third shielding body includes two arc-shaped convex surfaces that are oppositely disposed. One arc-shaped convex surface of the second shielding body is opposite to and has a rotation gap with one concave curved surface, and one arc-shaped convex surface of the third shielding body is opposite to and has a rotation gap with the other concave curved surface. The other arc-shaped convex surface of the second shielding body is spaced opposite to the end surface of the first housing, and the other arc-shaped convex surface of the third shielding body is spaced opposite to the end surface of the second housing. When an end part of the electronic apparatus is impacted by an external force, there are overlapping parts between the second shielding body and the first shielding body, and between the first shielding body and the third shielding body, and the first housing, the second shielding body, the first shielding body, the third shielding body, and the second housing may sequentially abut against each other and may sequentially limit each other, to buffer and reduce the impact force for each other, thereby avoiding affecting a service life of the electronic apparatus caused by damage to the shielding members.

It may be understood that, the concave curved surface is disposed to cooperate with the arc-shaped convex surface, so that rotation between the limiting body and the second shielding body or the third shielding body may be smoother and stabler, thereby ensuring reliability of folding and unfolding processes of the foldable electronic device. The concave curved surface may further limit the arc-shaped convex surface at a plurality of angles, thereby improving stability of relative motion between the first shielding body and the second shielding body, and improving structural reliability of the foldable electronic device.

In a possible implementation, the first shielding body is rotatably connected to the second shielding body and the third shielding body separately through rotating shafts, and both the second shielding body and the third shielding body are rotatably connected to the first housing and the second housing respectively through rotating shafts.

It may be understood that the second shielding body is separately connected to the first shielding body and the first housing through rotating shafts, so that a connection manner thereof is stabler, thereby ensuring that the second shielding body rotates more efficiently and stably. The third shielding body is separately connected to the first shielding body and the second housing through cylinders, so that a bonding force between the third shielding body and the first shielding body and a bonding force between the third shielding body and the end part of the second housing can be increased. When an impact occurs, dislocation is not likely to occur, and damage to another structure of the foldable electronic device is avoided as much as possible.

In a possible implementation, the first shielding body, the second shielding body, and the third shielding body are made of metal materials.

It may be understood that, in a use scenario, for example, a high temperature or a long-term bending scenario, the metal material may avoid deformation that is difficult to recover, thereby ensuring appearance exquisiteness of the foldable electronic device and improving product competitiveness.

In a possible implementation, the limiting body includes an arc-shaped end surface and two sliding surfaces that are oppositely disposed, each sliding surface is connected to one end of the arc-shaped end surface, the limiting block is located at a position of the sliding surface close to the arc-shaped end surface, each limiting block is provided with the concave curved surface, and the two concave curved surfaces are smoothly connected to two opposite ends of the sliding surface.

It may be understood that, the smooth connection between the concave curved surface and the sliding surface can simplify movement processes of the second shielding body and the third shielding body. The second shielding body and the third shielding body may respectively rotate under limits of the concave curved surfaces. In the folded state of the foldable electronic device, the sliding surface may abut against one side surface of the second shielding body or the third shielding body.

In a possible implementation, the first housing includes a first sub-bezel and a second sub-bezel that are oppositely disposed. The first sub-bezel is provided with a first end surface and a first appearance body convexly disposed on the first end surface, and the second sub-bezel is provided with a second end surface and a second appearance body convexly disposed on the second end surface. In the first direction, the first shielding body is located between the first appearance body and the second appearance body. The second shielding body is partially stacked with the first appearance body, and the arc-shaped convex surface of the second shielding body is spaced opposite to the first end surface. The third shielding body is partially stacked with the second appearance body, and the arc-shaped convex surface of the third shielding body is spaced opposite to the second end surface.

It may be understood that the first appearance body is partially stacked with the second shielding body, and the other part of the second shielding body is stacked with the first shielding body. The second appearance body is partially stacked with the third shielding body, and the other part of the third shielding body is stacked with the first shielding body. In the unfolded or folded state of the foldable electronic device, some side surfaces of the first sub-bezel, the second shielding member, the first shielding member, the third shielding member, and the third sub-bezel form one side appearance surface of the foldable electronic device, and the internal components are completely shielded from this side surface, thereby simplifying the appearance of the foldable electronic device and protecting the internal components.

In a possible implementation, the second shielding body further includes a first side surface and a second side surface that are oppositely disposed, and the third shielding body further includes a third side surface and a fourth side surface that are oppositely disposed. In the folded state of the foldable electronic device, the first side surface is spaced opposite to one sliding surface, the second side surface is spaced opposite to the first end surface, the third side surface is spaced opposite to the other sliding surface, and the fourth side surface is spaced opposite to the second end surface.

It may be understood that, in the folded state of the foldable electronic device, the first sub-bezel, the second shielding body, the first shielding body, the third shielding body, and the third sub-bezel are sequentially limited through opposite surfaces, to maintain stability of the folded state of the foldable electronic device.

In a possible implementation, the two arc-shaped convex surfaces of the second shielding body are a first arc-shaped convex surface and a second arc-shaped convex surface. The second shielding body further includes a first top surface, a first bottom surface, a first surface, and a second surface. The first side surface, the first arc-shaped convex surface, the first top surface, the second arc-shaped convex surface, the second side surface, and the first bottom surface are sequentially connected and are all connected to the first surface and the second surface. The first surface is disposed opposite to the second surface, the first side surface and the second side surface are separately disposed at an included angle relative to the first bottom surface, and the first surface is an appearance surface of the first shielding body. The two arc-shaped convex surfaces of the third shielding body are a third arc-shaped convex surface and a fourth arc-shaped convex surface. The third shielding body further includes a second top surface, a second bottom surface, a third surface, and a fourth surface. The third side surface, the third arc-shaped convex surface, the second top surface, the fourth arc-shaped convex surface, the fourth side surface, and the second bottom surface are sequentially connected and are all connected to the third surface and the fourth surface. The third surface and the fourth surface are oppositely disposed. The third side surface and the fourth side surface are separately disposed at an included angle relative to the second bottom surface, and the third surface is an appearance surface of the third shielding body.

It may be understood that, in the folded state of the foldable electronic device, the first top surface, the arc-shaped end surface of the first shielding member, and a fifth arc-shaped surface may approximately jointly form an arc profile. The arc profile may make appearances of the first shielding body, the second shielding body, and the third shielding body more concise, and conform to angles respectively obtained after the first housing and the second housing separately rotate through the central shaft assembly. In the unfolded state of the foldable electronic device, the first bottom surface, the second bottom surface, a bottom surface of the first sub-bezel, and a bottom surface of the third sub-bezel may be in one plane, so that when the foldable electronic device is in the unfolded state, an overall structure is more concise.

In a possible implementation, the rotating shafts of the first shielding body are a first rotating shaft and a second rotating shaft. A rotating shaft of the first appearance body is a third rotating shaft, and a rotating shaft of the second appearance body is a fourth rotating shaft. The second shielding body includes a first through hole and a second through hole, and the third shielding body includes a third through hole and a fourth through hole. The first rotating shaft penetrates through the first through hole, the second shielding body rotates relative to the first shielding body through the first rotating shaft, the second rotating shaft penetrates through the third through hole, the third shielding body rotates relative to the first shielding body through the second rotating shaft, the third rotating shaft penetrates through the second through hole, the first housing and the second shielding body rotate through the third rotating shaft, the fourth rotating shaft penetrates through the fourth through hole, and the second housing and the third shielding body rotate through the fourth rotating shaft.

In a possible implementation, the foldable electronic device includes a display, and the first housing, the second housing, the central shaft assembly, and the shielding members form a main body. The display is stacked with the main body, and the display includes a first part, a second part, and a third part that connects the first part and the second part. The first housing carries the first part, the second housing carries the second part, and the central shaft assembly supports the third part. The central shaft assembly drives the third part to bend.

In the folded state of the foldable electronic device, the first part and the second part face each other, or the first part and the second part face away from each other.

It may be understood that, in the folded state of the foldable electronic device, the first housing and the second housing separately rotate through the central shaft assembly, and are close to each other. Surfaces that are of the first housing and the second housing and that carry the display face each other. After being folded, the display is on an inner side of a structure of the main body. Alternatively, surfaces that are of the first housing and the second housing and that carry the display face away from each other. After being folded, the display is on an outer side of the structure. In other words, the foldable electronic device may be an inner foldable screen electronic device or an outer foldable screen electronic device. The first shielding body, the second shielding body, and the third shielding body may jointly form the part of the appearance structure of the foldable electronic device. Because the second shielding body and the third shielding body are partially stacked with the first shielding body, that is, there are overlapping parts, and do not directly bear impact payloads, an impact payload on the first shielding body may be decomposed to the first housing and the second housing on two sides, to protect the display from being impacted.

In a possible implementation, the central shaft assembly includes a base, a first rotating part, and a second rotating part. The base includes a first end and a second end, the first rotating part includes a third end and a fourth end, and the second rotating part includes a fifth end and a sixth end. Two first shielding bodies are respectively connected to the first end and the second end, two second shielding bodies are respectively located at the third end and the fourth end, and two third shielding bodies are respectively disposed at the fifth end and the sixth end.

It may be understood that the first shielding body may be directly connected to the two ends of the base. The second shielding body may not be connected to the first rotating part, and the third shielding body may not be connected to the second rotating part, and only positions are mutually limited. When the central shaft assembly is impacted, the gap between the first shielding body and the second shielding body, and the gap between the first shielding body and the third shielding body are small. The first shielding body, the second shielding body, and the third shielding body may sequentially limit each other, to buffer the external force. When the central shaft assembly is impacted by the external force, the first shielding body may bear a main impact payload, and the second shielding body and the third shielding body may not directly bear impact payloads, but buffer the external force on the first shielding body. In addition, positions of the base and the first rotating part limit each other, and positions of the base and the second rotating part limit each other, thereby reducing displacement of dislocation of the base, the first rotating part, and the second rotating part under the impact of the external force, reducing deformation of the display, and enhancing mechanical strength of the foldable electronic device. Similarly, when the second shielding body or the third shielding body is impacted by the external force, some energy of the impact may be transferred to the first shielding body, to disperse the impact force, thereby reducing dislocation of the first shielding body, the second shielding body, the third shielding body, and the central shaft assembly, and effectively protecting the display. When the foldable electronic device falls in the unfolded state, the first housing or the second housing is impacted first, and the impact force may be transferred from the first sub-bezel to the second shielding body adjacent to the first sub-bezel. Alternatively, the third sub-bezel transfers the impact force to the third shielding body, and the second shielding body and the third shielding body transfer a part of the impact force to the first shielding body again, to disperse the impact force and reduce dislocation of the first shielding body, the second shielding body, the third shielding body, and the central shaft assembly, and effectively protecting the display. Because the second shielding body is not directly connected to the first rotating part, movement of the second shielding body and the first rotating part does not affect each other. When the second shielding body is impacted by the external force, a motion function of the first rotating part is not affected, thereby reducing the impact of the first rotating part on the display and protecting the display.

BRIEF DESCRIPTION OF DRAWINGS

To describe the technical solutions in this application more clearly, the following briefly describes the accompanying drawings required for describing the implementations. It is clear that the accompanying drawings in the following description show merely some implementations of this application, and a person of ordinary skill in the art may still derive other drawings from these accompanying drawings without creative efforts.

DESCRIPTION OF EMBODIMENTS

The following describes the specific implementations of this application in more detail with reference to the accompanying drawings. Although the accompanying drawings show example implementations of this application, it should be understood that this application may be implemented in another manner different from that described herein. Therefore, this application is not limited to the following implementations.

For ease of understanding, terms in embodiments of this application are first explained. “A plurality of” means “two or more”.

Connection should be understood in a broad sense. For example, if A is connected to B, A may be directly connected to B, or A and B can be indirectly connected through an intermediate medium.

At present, foldable electronic devices are increasingly popular in the market. Take a foldable smartphone characterized by a flexible and bendable screen as an example. After the screen is bent, a dimension of the screen is similar to that of a common smartphone, and the foldable smartphone with the bent screen is easy to carry and use. After the screen is unfolded, a dimension of the screen may be similar to that of a tablet computer, and entertainment or office functions are convenient to use on the unfolded screen. The foldable smartphone has advantages of the electronic device and the tablet computer, thereby meeting current consumer’s needs. However, the bendable screen is more likely to break because of its large area or frequent folding activities. Therefore, screen protection is very important. Locations at which the foldable electronic device is most vulnerable to damage are end parts of a folded part of the screen. Therefore, how to effectively increase strength of the screen end parts of the folded part becomes a problem that cannot be avoided by the foldable electronic device.

Based on this, this application provides a foldable electronic device, to effectively improve strength of end parts of a foldable part of the foldable electronic device, thereby protecting internal components of the foldable electronic device.

Figure 1:
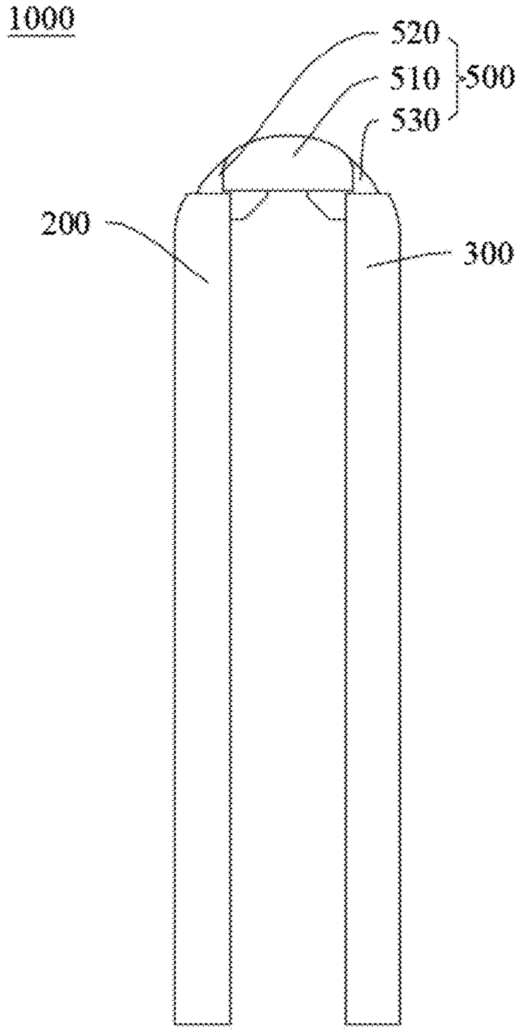
FIG. 1 is a schematic diagram of a foldable electronic device in a folded state at an angle according to an embodiment of this application.
Figure 2:
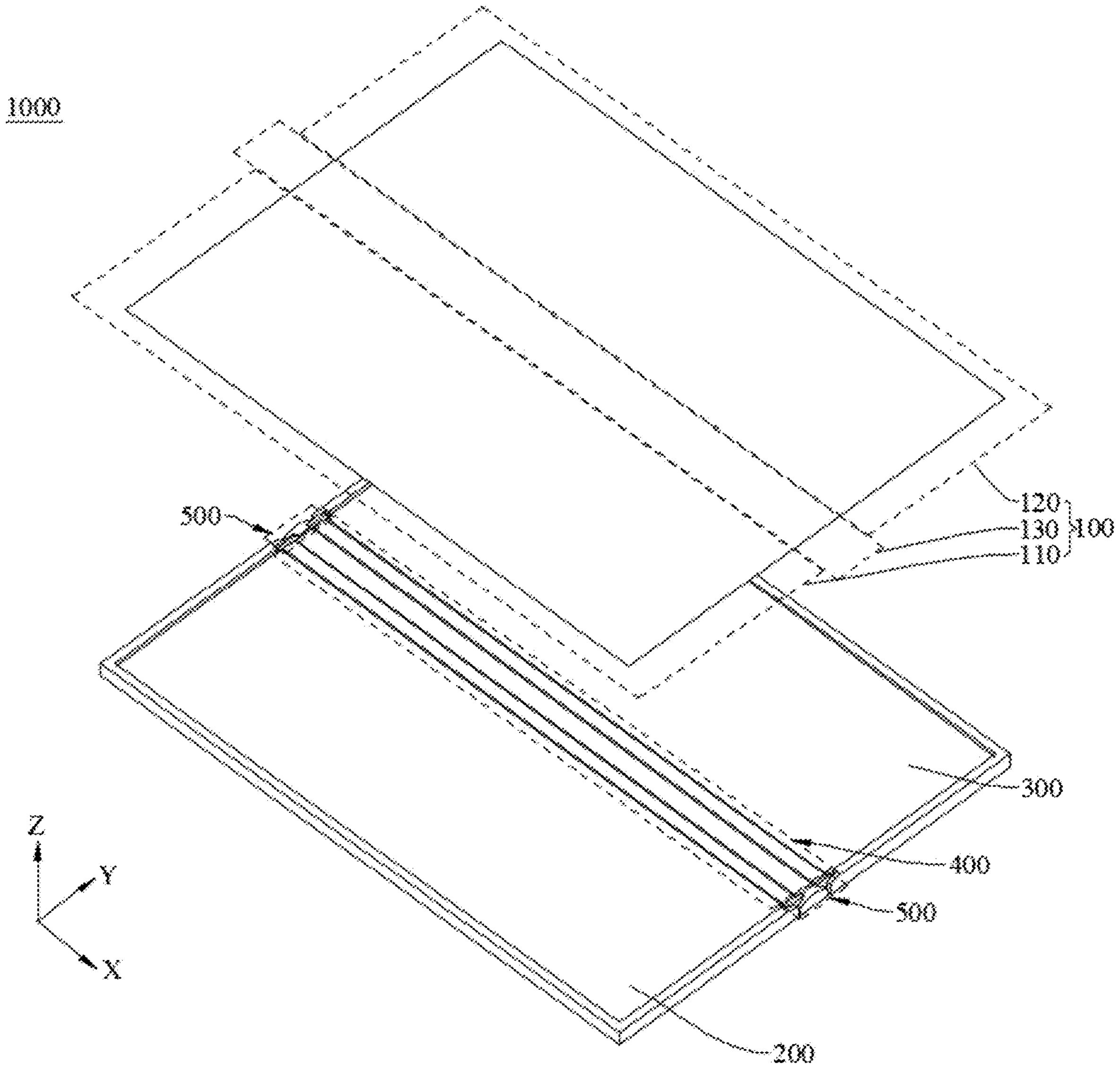
FIG. 2 is a schematic exploded diagram of a display and a main body of a foldable electronic device according to an embodiment of this application.
Figure 3:
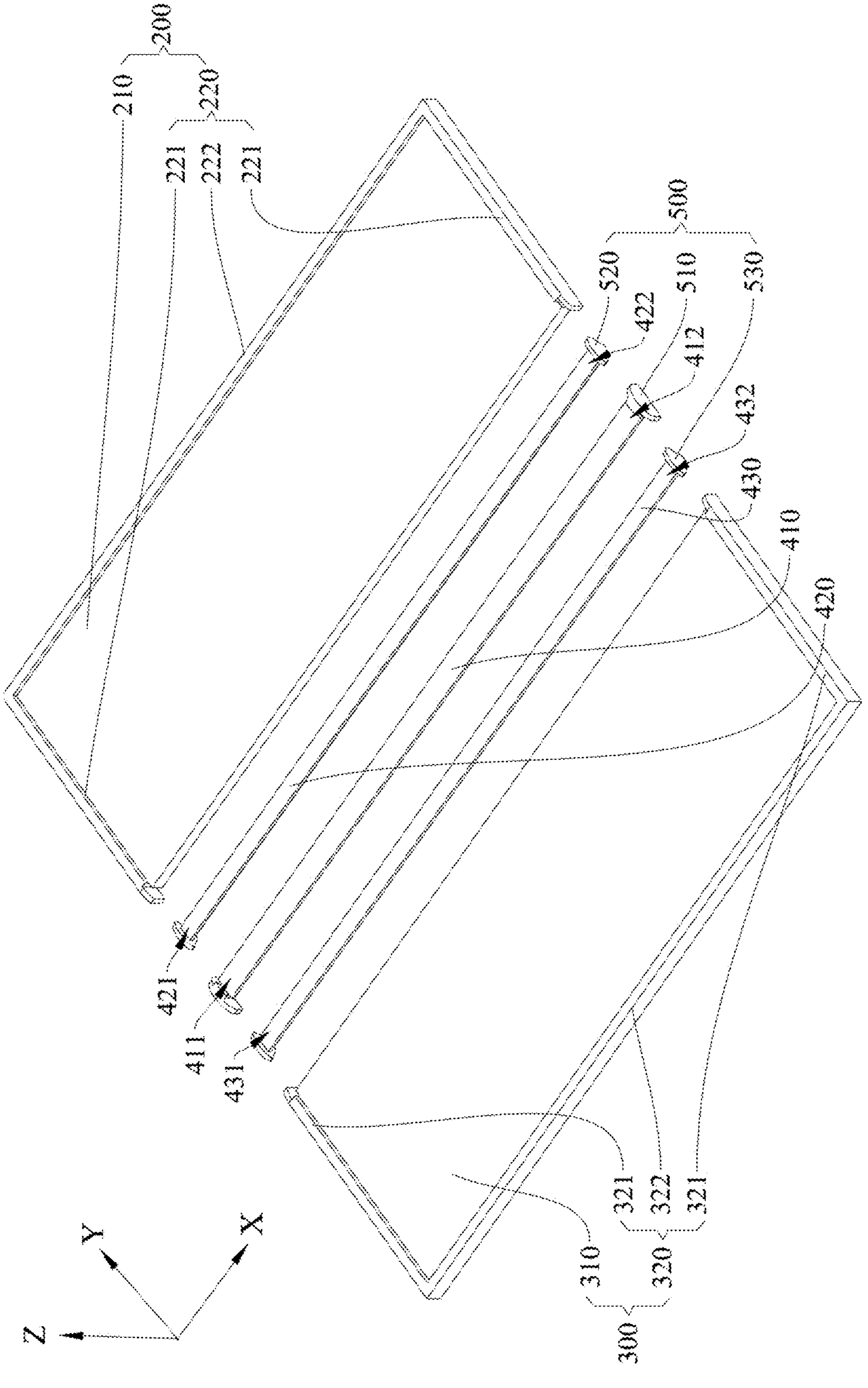
FIG. 3 is a schematic exploded diagram of a main body according to an embodiment of this application.

Refer to FIG. 1, FIG. 2, and FIG. 3. FIG. 1 is a schematic diagram of a structure of a foldable electronic device 1000 in a folded state according to an embodiment of this application. FIG. 2 is a schematic exploded diagram of a display 100 and a main body of the foldable electronic device 1000 according to an embodiment of this application. FIG. 3 is a schematic exploded diagram of the main body of the foldable electronic device 1000 according to an embodiment of this application.

The foldable electronic device 1000 includes but is not limited to a smartphone, a notebook computer, a tablet computer, a personal digital assistant, a wearable device, a vehicle-mounted device, or the like. In this embodiment of this application, an example in which the foldable electronic device 1000 is a smartphone is used for description.

The foldable electronic device 1000 shown in this embodiment of this application is an electronic device that can be folded once. The foldable electronic device 1000 may include two parts. The two parts may be oppositely close to each other to be folded until the foldable electronic device 1000 is in a folded state, and the two adjacent parts may be oppositely away from each other to be unfolded until the foldable electronic device 1000 is in an unfolded state.

For ease of description, a width direction of the foldable electronic device 1000 is defined as a Y direction, a length direction of the foldable electronic device 1000 is defined as an X direction, and a thickness direction of the foldable electronic device 1000 is defined as a Z direction. The X direction, the Y direction, and the Z direction are perpendicular to each other.

The foldable electronic device 1000 includes a display 100 and a main body (not marked in the figure). The display 100 is mounted on the main body. The display includes a display surface and a mounting surface, and the display surface and the mounting surface are oppositely disposed. The display surface is configured to display a text, an image, a video, or the like. The display 100 includes a first part 110, a second part 120, and a third part 130. The third part 130 is located between the first part 110 and the second part 120, and the third part 130 is flexible and may be bent in the Y direction. In this embodiment, the display 100 is a flexible display, for example, an organic light-emitting diode (OLED) display, an active matrix organic light-emitting diode or an active matrix organic light-emitting diode (AMOLED) display, or a quantum dot light-emitting diode (QLED) display. The first part 110 and the second part 120 may be actually bent when not being fastened.

The main body includes a first housing 200, a second housing 300, a central shaft assembly 400, and two shielding members 500. The first housing 200 is rotatably connected to the second housing 300 through the central shaft assembly 400. The first housing 200 and the second housing 300 respectively support the first part 110 and the second part 120. The central shaft assembly 400 drives the first housing 200 and the second housing 300 to be folded and unfolded. The first housing 200 and the second housing 300 may be oppositely close to each other to be folded until the foldable electronic device 1000 is in a folded state. The first housing 200 and the second housing 300 may be oppositely away from each other to be unfolded until the foldable electronic device 1000 is in an unfolded state, and the central shaft assembly 400 supports the foldable third part 130 of the display 100.

In a first direction (the Y-axis direction), the first housing 200 and the second housing 300 are respectively connected to two opposite sides of the central shaft assembly 400, and the central shaft assembly 400 implements relative rotation of the first housing 200 and the second housing 300. Each shielding member 500 includes a first shielding body 510, a second shielding body 520, and a third shielding body 530, the second shielding body 520 and the third shielding body 530 are located at two opposite sides of the first shielding body 510, and both the second shielding body 520 and the third shielding body 530 may rotate relative to the first shielding body 510. In a second direction, the second shielding body 520 is located at a side that is of the first shielding body 510 and that faces the central shaft assembly 400 and is partially stacked with the first shielding body 510, and the third shielding body 530 is located at the side that is of the first shielding body 510 and that faces the central shaft assembly 400 and is partially stacked with the first shielding body 510.

In the second direction (the X-axis direction), the two shielding members 500 are respectively located at two opposite ends of the central shaft assembly 400, the first shielding body 510 is connected to one end part of the central shaft assembly 400, the second shielding body 520 is capable of sliding and rotating relative to the first housing 200, and the third shielding body 530 is capable of sliding and rotating relative to the second housing 300. The first shielding body 510, the second shielding body 520, and the third shielding body 530 form a part of an appearance structure of the foldable electronic device 1000. The first direction is perpendicular to the second direction.

Appearance surfaces of the first shielding body 510, the second shielding body 520, and the third shielding body 530 jointly form an appearance surface of the appearance structure. The appearance surface of the appearance structure faces a same direction as some appearance surfaces of the first housing 200 and the second housing 300, and the appearance surfaces of the second shielding body 520 and the third shielding body 530 are respectively located in a gap between the first shielding body 510 and the first housing 200 and a gap between the first shielding body 510 and the second housing 300. In an unfolded state of the foldable electronic device 1000, the first housing 200 and the second housing 300 are flattened relative to each other, and the first housing 200, the second shielding body 520, the first shielding body 510, the third shielding body 530, and the second housing 300 are sequentially arranged in the first direction. When the foldable electronic device 1000 is in a folded state, the first housing 200 and the second housing 300 are oppositely folded, and the second shielding body 520 and the third shielding body 530 separately rotate by a specific angle relative to the first shielding body 510.

It should be noted that FIG. 2 is merely intended to describe an example of a connection relationship between the display 100, the first housing 200, the second housing 300, the central shaft assembly 400, and the shielding members 500, and does not specifically limit connection positions, specific structures, and quantities of components. A structure shown in this embodiment of this application does not constitute a specific limitation on the foldable electronic device 1000. In some other embodiments of this application, the foldable electronic device 1000 may include more or fewer components than those shown in the figure, some components may be combined, some components may be split, or different component arrangements may be used. The components shown in the figure may be implemented by hardware, software, or a combination of software and hardware.

In daily use, an electronic device with a large screen can improve user experience in some scenarios, but the electronic device with a large screen is inconvenient for daily carrying. Emergence of the foldable electronic device resolves the problem that the electronic device with a large screen is not easy to carry. When the foldable electronic device 1000 is in an unfolded state, a screen dimension of the electronic device may be far greater than that of a common electronic device, to implement large-screen display and operation functions of the foldable electronic device 1000, so that user experience can be well improved when a user watches a video or performs entertainment. When the user does not need the large screen, the foldable electronic device 1000 may be folded, and a display 100 of a foldable electronic device 1000 whose folded electronic device screen is on an outer side is half of that of the foldable electronic device 1000 in the unfolded state. This facilitates one-hand operation by the user. The display 100 is located between the first housing 200 and the second housing 300. The first housing 200 and the second housing 300 protect a display surface of the display 100, to greatly reduce a probability that the display 100 is damaged. In addition, an overall dimension is reduced, so that the foldable electronic device is easy to carry.

Still refer to FIG. 3. The first housing 200 is provided with a first mounting groove (not shown in the figure), the second housing is provided with a second mounting groove (not shown in the figure), and the first mounting groove and the second mounting groove communicate with each other to form a mounting groove. The central shaft assembly 400 is mounted in the mounting groove, and is fastened to the first housing 200 and the second housing 300, to implement a rotatable connection between the first housing 200 and the second housing 300. The first housing 200 and the second housing 300 may rotate relative to each other through the central shaft assembly 400, so that the main body is switched between a folded state and an unfolded state.

Both the first housing 200 and the second housing 300 are further provided with accommodation grooves (not shown in the figure), and the accommodation groove is configured to accommodate electronic elements such as a processor, a circuit board, and a camera module and structural components that are of the electronic device. A side that is of the central shaft assembly 400 and that faces away from the display 100 is an outer surface of the foldable electronic device 1000, and a side that carries the display 100 is an inner side. Actually, bearing plates (not marked in the figure) are disposed on inner sides of the first housing 200 and the second housing 300, the bearing plate is used for packaging the accommodation grooves, and the display 100 is mounted on the bearing plate and the bearing plate supports the flexible display 100.

The first housing 200 includes a first middle frame 210 and a first bezel 220. The first middle frame 210 may be a rectangle, the first bezel 220 surrounds three edges of the first middle frame 210, and the first mounting groove is located at a $4^{th}$ edge position of the first middle frame 210. The first bezel 220 and the first middle frame 210 are enclosed into an accommodation groove, and a bearing plate may be disposed to support a first part of the display. Specifically, the first bezel 220 includes two first sub-bezels 221 and one second sub-bezel 222. The two first sub-bezels 221 are respectively disposed on two short edges of the first housing 200. One end of the second sub-bezel 222 is connected to one first sub-bezel 221, and the other end is connected to the other first sub-bezel 221. The second sub-bezel 222 is located at a long edge of the first housing 200. The first mounting groove is located between the two first sub-bezels 221 and is spaced opposite to the second sub-bezel 222.

Each first sub-bezel 221 includes a first end surface 2210 and a first appearance body 2211. The first end surface 2210 faces away from the second sub-bezel 222. The first appearance body 2211 is convexly disposed on the first end surface 2210. In the X-axis direction, that is, a thickness direction of the first sub-bezel 221, a thickness of the first appearance body 2211 is less than a thickness of the first sub-bezel 221. The first appearance body 2211 includes a first appearance surface (not marked in the figure) and a first inner side surface 2211*a* that faces away from the first appearance surface. The first appearance surface is exposed to the outside of the electronic device, and is coplanar with an outer surface of the first sub-bezel 221. The first inner side surface 2211*a* is connected to the first end surface 2210 at an included angle. In this embodiment, the included angle is 90 degrees, which facilitates assembly with the shielding member 500.

The second housing 300 includes a second middle frame 310 and a second bezel 320. The second middle frame 310 may be a rectangle, the second bezel 320 surrounds three edges of the second middle frame 310, and the second mounting groove is located at a $4^{th}$ edge position. The second bezel 320 and the second middle frame 310 are enclosed into an accommodation groove, and a bearing plate may be disposed to support a second part 120 of the display 100. Specifically, the second bezel 320 includes two third sub-bezels 321 and one fourth sub-bezel 322. The two third sub-bezels 321 are respectively disposed on two short edges of the second housing 300. One end of the fourth sub-bezel 322 is connected to one third sub-bezel 321, and the other end is connected to the other third sub-bezel 321. The fourth sub-bezel 322 is located at a long edge of the second housing 300. The second mounting groove (not shown in the figure) is located between the two third sub-bezels 321 and is spaced opposite to the fourth sub-bezel 322.

Each third sub-bezel 321 includes a second end surface 3210 and a second appearance body 3211. The second end surface 3210 faces away from the fourth sub-bezel 322. The second appearance body 3211 is convexly disposed on the second end surface 3210. In the X-axis direction, that is, a thickness direction of the third sub-bezel 321, a thickness of the second appearance body 3211 is less than a thickness of the third sub-bezel 321. The second appearance body 3211 includes a second appearance surface (not marked in the figure) and a second inner side surface 3211*a* that faces away from the second appearance surface. The second appearance surface is exposed to the outside of the electronic device, and is coplanar with an outer surface of the third sub-bezel 321. The second inner side surface 3211*a* is connected to the second end surface 3210 at an included angle. In this embodiment, the included angle is 90 degrees, which facilitates assembly with the shielding member 500.

The central shaft assembly 400 is disposed between the first housing 200 and the second housing 300, and is separately connected to the first housing 200 and the second housing 300 through the first mounting groove and the second mounting groove. In an unfolded state of the foldable electronic device 1000, the first housing 200, the second housing 300, and the central shaft assembly 400 jointly support the display 100. The first part 110 is opposite to the first housing 200, the second part 120 is opposite to the second housing 300, and the third part 130 is opposite to the central shaft assembly 400. In a folded state of the foldable electronic device 1000, the first housing 200 and the second housing 300 separately rotate through the central shaft assembly 400, and are close to each other. Surfaces that are of the first housing 200 and the second housing 300 and that carry the display 100 face each other. After being folded, the display 100 is on an inner side of a structure of the main body. In an implementation, surfaces that are of the first housing 200 and the second housing 300 and that carry the display 100 face away from each other. After being folded, the display 100 is on an outer side of the structure. In other words, the foldable electronic device 1000 may be an inner foldable screen electronic device or an outer foldable screen electronic device. This is not limited herein The central shaft assembly 400 includes a base 410, a first rotating part 420, and a second rotating part 430. The first rotating part 420 and the second rotating part 430 are symmetrically connected to two sides of the base 410. The base 410 and the first rotating part 420 may be rotatably connected to each other, and the base 410 and the second rotating part 430 may be rotatably connected to each other. A specific structure thereof may be a rotating shaft mechanism in the conventional technology. This is not described herein. The central shaft assembly 400 is configured to support the display 100. The first rotating part 420 is located in the first mounting groove of the first housing 200 and is rotatably connected to the first housing 200 and the base 410. The second rotating part 430 is disposed in the second mounting groove of the second housing 300 and is rotatably connected to the second housing 300 and the base 410. When the foldable electronic device 1000 is unfolded and folded, the first rotating part 420 and the second rotating part 430 separately rotate relative to the base 410. When unfolding and folding actions are completed, the first rotating part 420 and the base 410 limit each other, the base 410 and the second rotating part 430 limit each other, and the first rotating part 420, the base 410, and the second rotating part 430 and both the first housing 200 and the second housing 300 limit each other, so that the foldable electronic device 1000 can be positioned in the unfolded state and can be positioned in the folded state or in an intermediate state, and a structure of the foldable electronic device 1000 can also be prevented from being damaged due to excessive rotation of the first housing 200 and the second housing 300.

The base 410, the first rotating part 420, and the second rotating part 430 each include two opposite end parts. The base 410 includes a first end 411 and a second end 412, the first rotating part 420 includes a third end 421 and a fourth end 422, and the second rotating part 430 includes a fifth end 431 and a sixth end 432. The first end 411, the second end 412, the third end 421, the fourth end 422, the fifth end 431, and the sixth end 432 are configured to cooperate with the shielding members 500.

Figure 4:
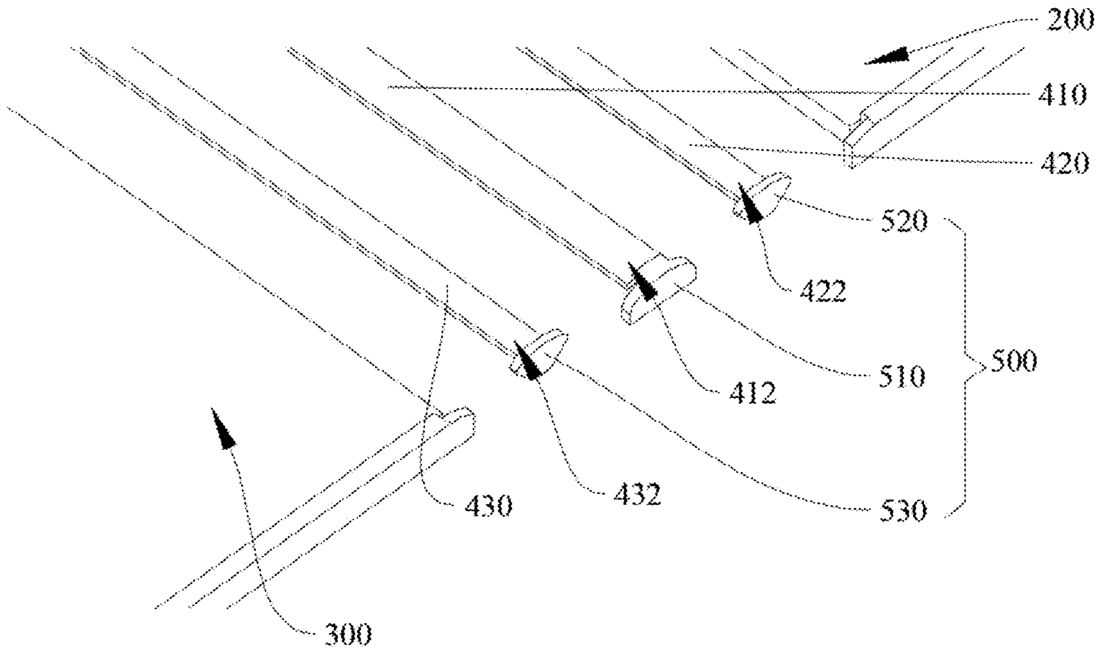
FIG. 4 is a schematic enlarged diagram of a partial structure of a foldable electronic device shown in FIG. 3.
Figure 5:
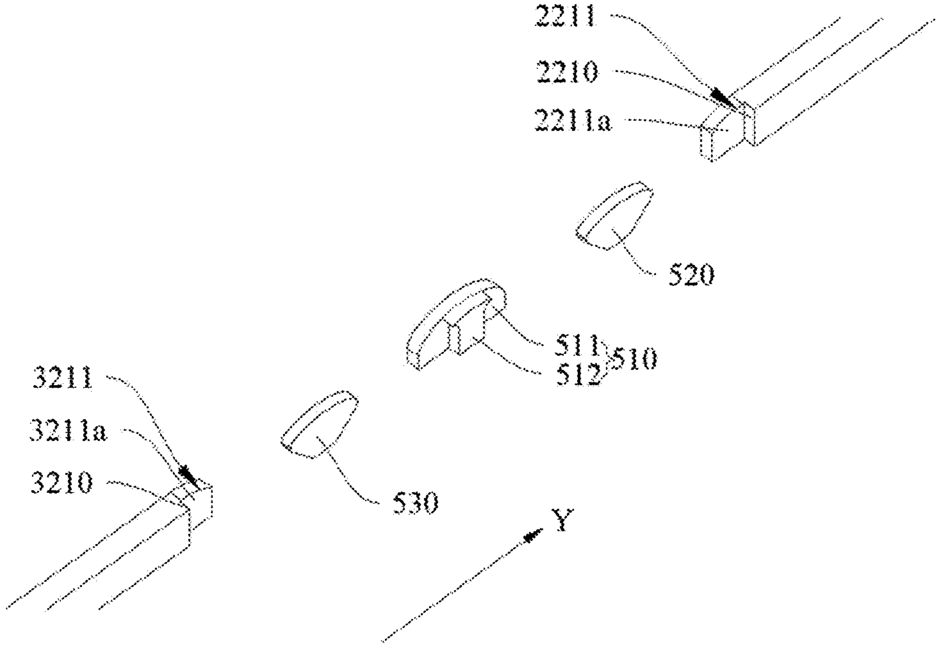
FIG. 5 is a schematic exploded diagram of a shielding member, a part of a first sub-bezel, and a part of a third sub-bezel of a foldable electronic device at an angle according to an embodiment of this application.
Figure 6A:
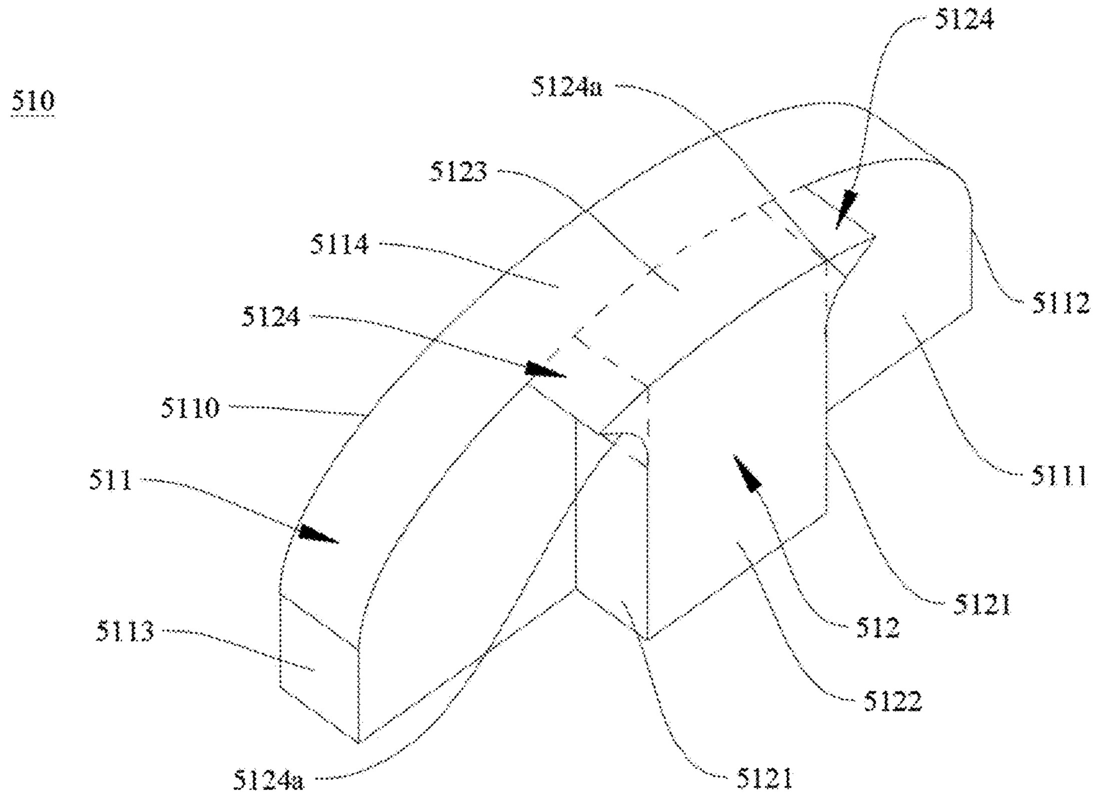
FIG. 6*a* is a schematic diagram of a structure of a first shielding body according to this application.
Figure 6B:
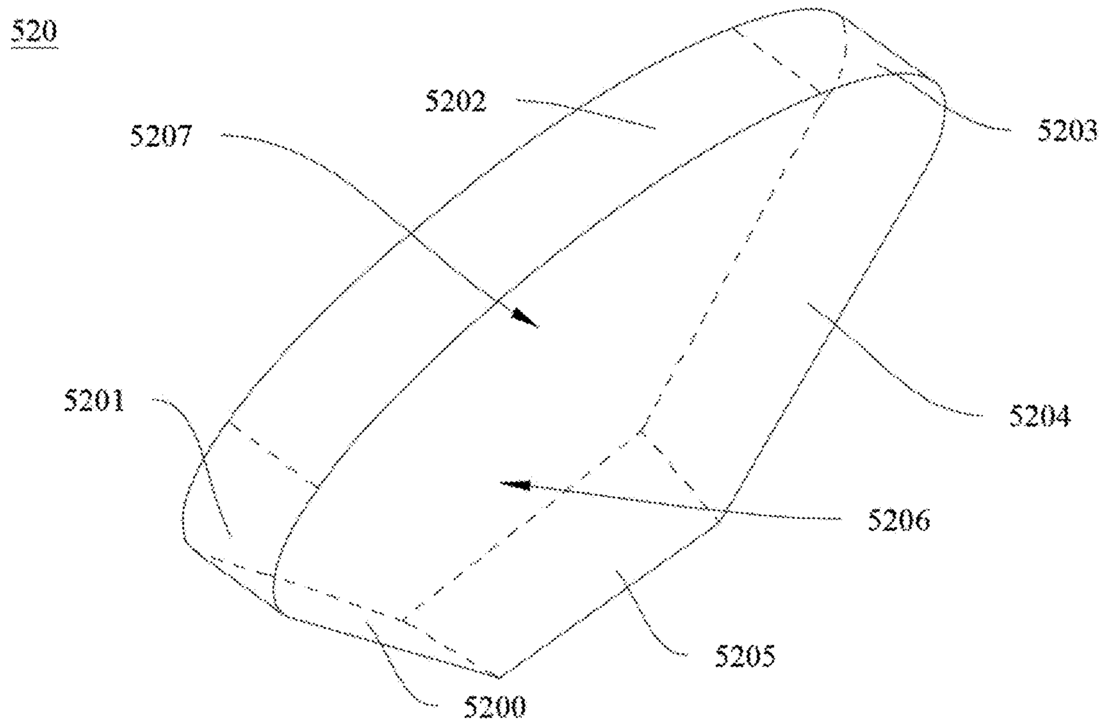
FIG. 6*b* is a schematic diagram of a structure of a second shielding body according to this application.
Figure 6C:
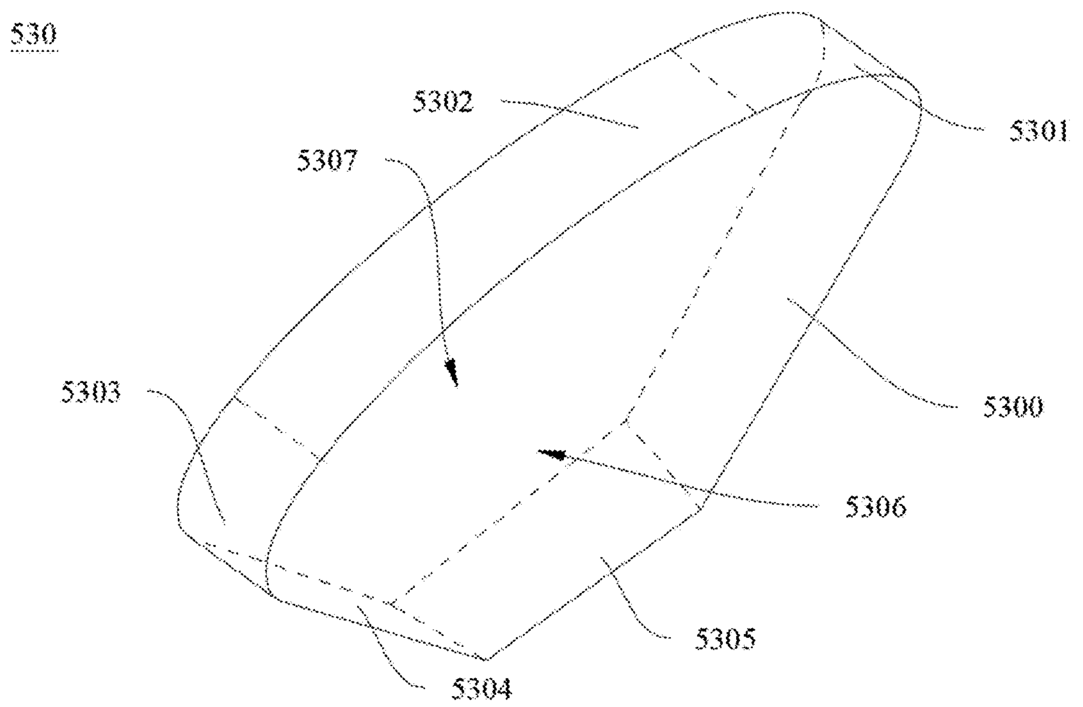
FIG. 6*c* is a schematic diagram of a structure of a third shielding body according to this application.

Refer to FIG. 4, FIG. 5, FIG. 6*a*, FIG. 6*b*, and FIG. 6*c*. FIG. 4 is a schematic enlarged diagram of a partial structure of the foldable electronic device 1000 shown in FIG. 3. FIG. 5 is a schematic exploded diagram of the shielding member 500, a part of the first sub-bezel 221, and a part of the third sub-bezel 321 of the foldable electronic device 1000 at an angle according to an embodiment of this application. FIG. 6*a* is a schematic diagram of a structure of the first shielding body according to this application. FIG. 6*b* is a schematic diagram of a structure of the second shielding body according to an embodiment of this application. FIG. 6*c* is a schematic diagram of a structure of the third shielding body according to an embodiment of this application.

There are two shielding members 500 that are respectively located at the two opposite ends of the central shaft assembly 400, and are used as appearance parts of the foldable electronic device 1000. It may be understood that the first housing 200, the second housing 300, and the shielding members 500 are housings of the electronic apparatus, and surfaces facing away from the display 100 form an appearance surface of the foldable electronic device 1000. The two shielding members 500 are symmetrically disposed in the X-axis direction. First shielding bodies 510 of the two shielding members 500 are respectively located at the first end 411 and the second end 412 of the base 410. Second shielding bodies 520 of the two shielding members 500 are respectively located at the third end 421 and the fourth end 422 of the first rotating part 420, and two third shielding bodies 530 are respectively located at the fifth end 431 and the sixth end 432 of the second rotating part 430.

The first shielding body 510, the second shielding body 520, and the third shielding body 530 may jointly form a part of the appearance structure of the foldable electronic device 1000, and may shield internal parts of space in which the central shaft assembly 400 is located while protecting the internal components, so that an appearance of the foldable electronic device 1000 is more exquisite. The shielding members 500 are respectively located at the two ends of the central shaft assembly 400, and may further provide uniform shielding effect for the two ends of the central shaft assembly 400, so that the appearance of the foldable electronic device 1000 is more concise.

Refer to FIG. 6*a*. The first shielding body 510 includes a main shielding body 511 and a limiting body 512. Specifically, the main shielding body 511 includes a main shielding body appearance surface 5110, a connection surface 5111 that faces away from the main shielding body appearance surface 5110, a first surface 5112 and a second surface 5113 that are oppositely disposed, and a third surface 5114 and a fourth surface (not marked in the figure) that are oppositely disposed. The first surface 5112, the third surface 5114, the second surface 5113, and the fourth surface are sequentially connected, and are all connected to the connection surface 5111 and the main shielding body appearance surface 5110 vertically or at an included angle. The third surface 5114 may be a convex surface, which is an arc-shaped surface in this embodiment. Two ends of the arc-shaped surface are respectively connected to the first surface 5112 and the second surface 5113. An arc-shaped angle is consistent with a folding angle of the central shaft assembly 400 after the central shaft assembly 400 is folded, and the arc-shaped surface is also an arc that adapts to folding of the display 100.

The limiting body 512 may be a rectangular-like block body and is disposed on a side surface of the main shielding body 511. Specifically, the limiting body 512 is convexly disposed on the connection surface 5111, is specifically disposed in a middle position of the connection surface 5111, and includes two sliding surfaces 5121 that are oppositely disposed, a first connection surface 5122, and an arc-shaped end surface 5123. The arc-shaped end surface is connected to the two sliding surfaces 5121 and the first connection surface 5122. The sliding surfaces 5121 are connected to the connection surface 5111, one sliding surface 5121 faces a same direction as the first surface 5112, and the other sliding surface 5121 faces a same direction as the second surface 5113. The first end 411 of the base 410 may be connected to a first connection surface 5122 of one limiting body 512, and the second end 412 of the base 410 may be connected to a first connection surface 5122 of another limiting body 512.

Two limiting blocks 5124 are convexly disposed on the limiting body 512. The limiting blocks 5124 are located at positions of the two sliding surfaces 5121 close to the arc-shaped end surface 5123. The limiting block 5124 includes a concave curved surface 5124*a*. The concave curved surface 5124*a* is smoothly connected to the sliding surface 5121. The concave curved surface 5124*a* is an arc-shaped surface and is concave to the back of the limiting block 5124, the arc-shaped end surface 5123 of the limiting body 512 and end surfaces of the limiting blocks 5124 are flush with the third surface 5114 of the main shielding body 511. The second shielding body 520 and the third shielding body 530 are respectively located at two opposite sides of the limiting body 512. The second shielding body 520 is partially stacked with the main shielding body 511, and the third shielding body 530 is partially stacked with the first shielding body 510. Two opposite sides of the second shielding body 520 are respectively in rotatable contact with a side surface of the limiting body 512 and an end surface of the first housing 200. Two opposite sides of the third shielding body 530 rotatably abut against the other side surface of the limiting body 512 and an end surface of the second housing 300 respectively. The limiting blocks 5124 respectively limit the second shielding body 520 and the third shielding body 530.

Refer to FIG. 6*b*. In this application, the second shielding body 520 is shown as a sector-like block body, and includes a first side surface 5200, a first arc-shaped convex surface 5201, a first top surface 5202, a second arc-shaped convex surface 5203, a second side surface 5204, a first bottom surface 5205, a first surface 5206, and a second surface 5207. It may be understood that the second shielding body 520 includes two arc-shaped convex surfaces that are oppositely disposed, and the two arc-shaped convex surfaces include the first arc-shaped convex surface 5201 and the second arc-shaped convex surface 5203. The first surface 5206 and the second surface 5207 face away from each other. In this application, a structure of the second shielding body 520 is shown by using the first surface 5206 and the second surface 5207 as sectors. It should be understood that the first surface 5206 and the second surface 5207 include but are not limited to shapes such as a sector, an ellipse, or a rectangle. The first side surface 5200, the first arc-shaped convex surface 5201, the first top surface 5202, the second arc-shaped convex surface 5203, the second side surface 5204, and the first bottom surface 5205 are sequentially connected. The first side surface 5200, the first arc-shaped convex surface 5201, the first top surface 5202, the second arc-shaped convex surface 5203, and the second side surface 5204 are sequentially and smoothly connected. The first side surface 5200 and the first bottom surface 5205 are connected at an included angle, and the second side surface 5204 and the first bottom surface 5205 are connected at an included angle. The first top surface 5202 is opposite to the first bottom surface 5205, and the first arc-shaped convex surface 5201, the second arc-shaped convex surface 5203, and the first top surface 5202 are arcs with different curvatures. In this embodiment, the first arc-shaped convex surface 5201 and the second arc-shaped convex surface 5203 are arcs (the arcs are ensured to be adapted to shapes of the concave curved surfaces 5124*a* of the limiting blocks) and have a same curvature. It may be understood that the second shielding body 520 is a symmetric structure. The second arc-shaped convex surface 5203 of the second shielding body cooperates with the first end surface of the first sub-bezel 221, and the first arc-shaped convex surface 5201 cooperates with the limiting block 5124.

Refer to FIG. 6*c*. In this application, the third shielding body 530 is shown as a sector-like block body, and includes a third side surface 5300, a third arc-shaped convex surface 5301, a second top surface 5302, a fourth arc-shaped convex surface 5303, a fourth side surface 5304, a second bottom surface 5305, a third surface 5306, and a fourth surface 5307. It may be understood that the third shielding body 530 includes two arc-shaped convex surfaces that are oppositely disposed, and the two arc-shaped convex surfaces include the third arc-shaped convex surface 5301 and the fourth arc-shaped convex surface 5303. The third surface 5306 and the fourth surface 5307 face away from each other. In this application, a structure of the third shielding body 530 is shown by using the third surface 5306 and the fourth surface 5307 as sectors. It should be understood that the third surface 5306 and the fourth surface 5307 include but are not limited to shapes such as a sector, an ellipse, or a rectangle. The third side surface 5300, the third arc-shaped convex surface 5301, the second top surface 5302, the fourth arc-shaped convex surface 5303, the fourth side surface 5304, and the second bottom surface 5305 are sequentially connected. The third side surface 5300, the third arc-shaped convex surface 5301, the second top surface 5302, the fourth arc-shaped convex surface 5303, and the fourth side surface 5304 are sequentially and smoothly connected. The third side surface 5300 and the second bottom surface 5305 are connected at an included angle, and the fourth side surface 5304 and the second bottom surface 5305 are connected at an included angle. The second top surface 5302 is opposite to the second bottom surface 5305, and the third arc-shaped convex surface 5301, the second top surface 5302, and the fourth arc-shaped convex surface 5303 are arcs with different curvatures. In this embodiment, the third arc-shaped convex surface 5301 and the fourth arc-shaped convex surface 5303 are arcs (the arcs are ensured to be adapted to shapes of the concave curved surfaces 5124*a* of the limiting blocks 5124) and have a same curvature. It may be understood that the third shielding body 530 is a symmetric structure. The fourth arc-shaped convex surface 5303 of the third shielding body 530 cooperates with the second end surface 3210 of the third sub-bezel 321, and the third arc-shaped convex surface 5301 cooperates with the other limiting block 5124 away from the second shielding body.

In a possible implementation, the first shielding body 510, the second shielding body 520, and the third shielding body 530 are made of metal materials. In a use scenario, for example, a high temperature or a long-term bending scenario, the metal material may avoid deformation that is difficult to recover, thereby ensuring appearance exquisiteness of the foldable electronic device and improving product competitiveness.

Figure 7:
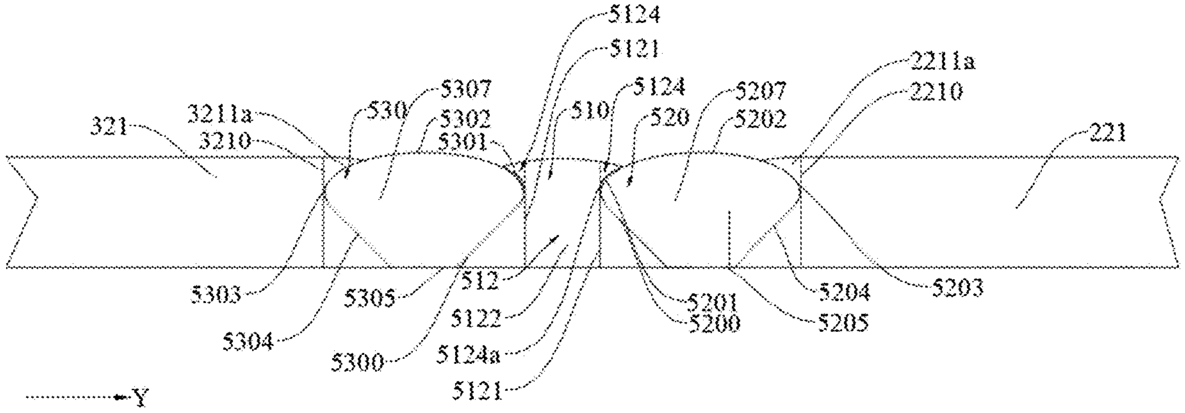
FIG. 7 is a schematic diagram of a structure of a side surface of a foldable electronic device 1000 in an unfolded state according to an embodiment of this application.
Figure 8:
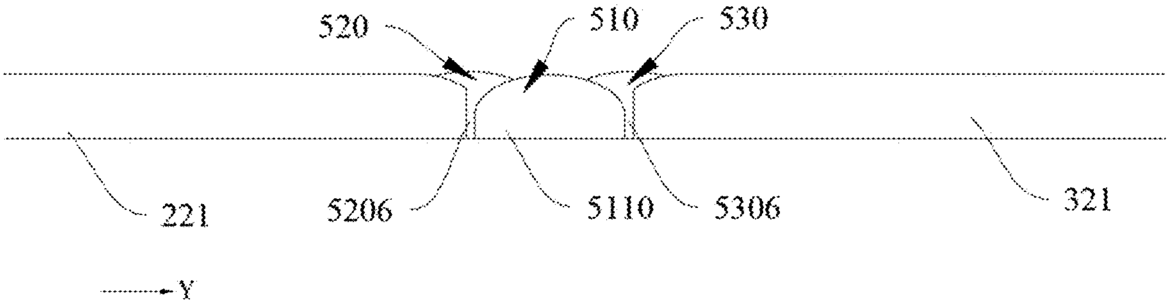
FIG. 8 is a schematic diagram of a structure of a side surface of a foldable electronic device in an unfolded state according to an embodiment of this application.

Refer to FIG. 7 and FIG. 8. FIG. 7 is a schematic diagram of a structure of a side surface of the foldable electronic device 1000 in an unfolded state according to an embodiment of this application. FIG. 8 is a schematic diagram of a structure of an outer side surface of the foldable electronic device 1000 in an unfolded state according to an embodiment of this application.

The foldable electronic device 1000 is in the unfolded state. The two shielding members 500 are symmetric. An assembly relationship between a shielding member 500 and the central shaft assembly 400 is described by using one shielding member 500 as an example.

The central shaft assembly 400 is mounted between the first housing 200 and the second housing 300, and the shielding member 500 is located between the first sub-bezel 221 and the third sub-bezel 321 (that is, between the first housing 200 and the second housing 300). As shown in FIG. 2 and FIG. 3, the limiting block 5124 of the first shielding body 510 faces the second end 412 of the base 410, and the first connection surface 5122 of the limiting body 512 is fastened to a surface of the second end 412. The second surface 5207 of the second shielding body 520 faces the fourth end 422 of the first rotating part 420 and may be fastened to an end surface of the fourth end 422. The fourth surface 5307 of the third shielding body 530 faces the sixth end 432 of the second rotating part 430 and may be fastened to an end surface of the sixth end 432.

The second shielding body 520, the first shielding body 510, and the third shielding body 530 are sequentially arranged in a width direction (the Y-axis direction), and a part of the second shielding body 520 and a part of the third shielding body 530 are stacked with the first shielding body 510. The second shielding body 520 is spaced opposite to the limiting body 512, and there is a rotation gap between the first arc-shaped convex surface 5201 and the concave curved surface 5124*a* of the limiting block 5124. The third shielding body 530 is spaced opposite to the other side of the limiting body 512 of the first shielding body 510, and there is a rotation gap between the third arc-shaped convex surface 5301 and the concave curved surface 5124*a* of the limiting block 5124. When the shielding member 500 is impacted, there are overlapping parts between the second shielding body 520 and the first shielding body 510, and between the first shielding body 510 and the third shielding body 530, and the first housing 200, the second shielding body 520, the first shielding body 510, the third shielding body 530, and the second housing 300 sequentially limit each other.

The main shielding body appearance surface 5110 of the first shielding body 510 and an outer side surface of the first sub-bezel 221 face a same direction, and may be coplanar. Specifically, the main shielding body appearance surface 5110 and an outer side surface of the first appearance body 2211 face a same direction. The main shielding body appearance surface 5110 of the first shielding body 510 and an outer side surface of the third sub-bezel 321 face a same direction, and may be coplanar. Specifically, the main shielding body appearance surface 5110 and an outer side surface of the second appearance body 3211 face a same direction. The first surface 5206 of the second shielding body 520 is located in a gap between the first shielding body 510 and the first sub-bezel 221. The third surface 5306 of the third shielding body 530 is located in a gap between the first shielding body 510 and the third sub-bezel 321. The second shielding body 520, the first shielding body 510, and the third shielding body 530 are jointly connected to the first housing and the second housing and shield the central shaft assembly 400. Appearance surfaces of the first shielding body 510, the second shielding body 520, and the third shielding body 530 jointly form an appearance surface of the appearance structure. In other words, the main shielding body appearance surface 5110 of the first shielding body 510, the first surface 5206 of the second shielding body 520, the third surface 5306 of the third shielding body 530, the outer side surface of the first bezel 220, and an outer side surface of the second bezel 320 jointly serve as outer end surfaces of two ends of the main body, that is, the appearance surface.

The appearance surface of the appearance structure faces a same direction as some appearance surfaces of the first housing 200 and the second housing 300, and the appearance surfaces of the second shielding body 520 and the third shielding body 530 are respectively located in a gap between the first shielding body 510 and the first housing 200 and a gap between the first shielding body 510 and the second housing 300. When the foldable electronic device 1000 is in a folded state, the first housing 200 and the second housing 300 are oppositely folded through the central shaft assembly 400, and the second shielding body 520 and the third shielding body 530 separately rotate by a specific angle relative to the first shielding body 510 as the central shaft assembly 400 rotates.

Side surfaces of the first sub-bezel 221, the second shielding body 520, the first shielding body 510, the third shielding body 530, and the third sub-bezel 321 jointly form one side appearance surface of the foldable electronic device 1000. The first shielding body 510, the second shielding body 520, and the third shielding body 530 jointly cover a spacing between the first sub-bezel 221 and the third sub-bezel 321. Specifically, the second shielding body 520 has overlapping parts with both the first shielding body 510 and the first appearance body 2211 of the first sub-bezel 221, so that the first sub-bezel 221, the second shielding body 520, and the first shielding body 510 are sequentially stacked, and there are no gaps in the Y direction. Same as the second shielding body 520, the third shielding body 530 has overlapping parts with both the second appearance body 3211 of the third sub-bezel 321 and the first shielding body 510, and there are no gaps between the third sub-bezel 321 and the third shielding body 530, and between the third shielding body 530 and the first shielding body 510 in the Y direction. It may be understood that, in an unfolded state or a folded state of the foldable electronic device 1000, there are no gaps between the second shielding body 520 and the first shielding body 510, and between the first shielding body 510 and the third shielding body 530, and there are no gaps between the second shielding body 520, the first shielding body 510, and the third shielding body 530 and both the first housing 200 and the second housing 300, so that the central shaft assembly and the internal components of the foldable electronic device 1000 are shielded, thereby protecting the internal components and hiding the internal components. Therefore, the appearance of the foldable electronic device 1000 is more concise and beautiful.

Specifically, the second shielding body 520 includes two arc-shaped convex surfaces that are oppositely disposed, that is, the first arc-shaped convex surface 5201 and the second arc-shaped convex surface 5203. The third shielding body 530 includes two arc-shaped convex surfaces that are oppositely disposed, that is, the third arc-shaped convex surface 5301 and the fourth arc-shaped convex surface 5303. One arc-shaped convex surface of the second shielding body 520 and one arc-shaped convex surface of the third shielding body are respectively disposed opposite to the two concave curved surfaces 5124*a*. In other words, the first arc-shaped convex surface 5201 of the second shielding body 520 is spaced opposite to and has a rotation gap with the concave curved surface 5124*a* of the limiting body 512, and the third arc-shaped convex surface 5301 of the third shielding body 530 is spaced opposite to and has a rotation gap with the other concave curved surface 5124*a* of the limiting body 512 of the first shielding body 510. The other arc-shaped convex surface of the second shielding body 520 and the other arc-shaped convex surface of the third shielding body 530 respectively slide relative to the end surface of the first housing 200 and the end surface of the second housing 300 and are rotatable. In other words, the second arc-shaped convex surface 5203 of the second shielding body 520 is opposite to the first end surface 2210 and has a gap, the first surface 5206 of the second shielding body 520 is opposite to the first inner side surface 2211*a* of the first sub-bezel 221, and the first end surface 2210 of the first sub-bezel 221 is opposite to the second arc-shaped convex surface 5203 and has a gap.

An unfolded state of the third shielding body 530 is similar to that of the second shielding body 520. The fourth arc-shaped convex surface 5303 of the third shielding body 530 is opposite to the second end surface 3210 and has a gap, the third surface 5306 of the third shielding body 530 is opposite to the second inner side surface 3211*a* of the third sub-bezel 321, and the second end surface 3210 of the third sub-bezel 321 is opposite to the fourth arc-shaped convex surface 5303 and has a gap.

The first shielding body 510 is fastened to the base 410, and the first housing 200, the second shielding body 520, the first shielding body 510, the third shielding body 530, and the second housing 300 sequentially limit each other and keep stable through cooperation, to limit a position of the shielding member 500. In addition, the central shaft assembly 400 implements flattened states and positioning of the first housing 200 and the second housing 300, limits relative positions of the second shielding body 520, the first shielding body 510, and the third shielding body 530 in the Y-axis direction, and limits relative positions of the second shielding body 520, the first shielding body 510, and the third shielding body 530 in the Y-axis direction with the first housing 200 and the second housing 300. In other words, when the first housing 200 and the second housing 300 are flattened relative to each other, spreading angles of the second shielding body 520, the first shielding body 510, and the third shielding body 530 are determined through the central shaft assembly.

When the foldable electronic device 1000 is impacted by an external force, sequential abutting against each other between the first sub-bezel 221, the second shielding body 520, the first shielding body 510, the third shielding body 530, and the third sub-bezel 321 reduces displacement of dislocation of each component. The first shielding body 510 has overlapping positions with the second shielding body 520 and the third shielding body 530, an overlapping position between the first shielding body 510 and the second shielding body 520 and an overlapping position between the first shielding body 510 and the third shielding body 530 may strengthen mechanical strength of an appearance housing of the foldable electronic device 1000 in this part of the central shaft assembly 400, thereby avoiding damage to the foldable electronic device 1000 caused by insufficient strength of a joint between the first shielding body 510 and the second shielding body 520 and a joint between the first shielding body 510 and the third shielding body 530. A middle frame assembly of the foldable electronic device 1000 presents seamless all-metal appearance effect, thereby improving exquisiteness of the foldable electronic device 1000.

In a possible embodiment, the first shielding body 510 may be connected to two ends of the base 410. The second shielding body 520 is not directly connected to the first rotating part 420, and the third shielding body 530 is not directly connected to the second rotating part 430, and only positions are mutually limited. The first shielding body 510, the first mounting groove, and the first sub-bezel 221 may jointly limit the second shielding body 520, and the first shielding body 510, the second mounting groove, and the third sub-bezel 321 may jointly limit the third shielding body 530.

When the central shaft assembly 400 is impacted, a gap between the first shielding body 510 and the second shielding body 520, and a gap between the first shielding body 510 and the third shielding body 530 are small, to buffer the external force. When an end part of the central shaft assembly 400 is impacted by the external force, the first shielding body 510 may bear a main impact payload. Because the second shielding body 520 and the third shielding body 530 partially overlap the first shielding body 510, and do not directly bear impact payloads, the second shielding body 520 may transfer the impact payload on the first shielding body 510 to the first sub-bezel 221, and the third shielding body 530 may transfer the impact payload on the first shielding body 510 to the third sub-bezel 321. The impact payload received by the first shielding body 510 is decomposed to the second shielding body 520 and the third shielding body 530, to buffer the external force on the first shielding body 510. In addition, positions of the base 410 and the first rotating part 420 limit each other, and positions of the base 410 and the second rotating part 430 limit each other, thereby reducing displacement of dislocation of the base 410, the first rotating part 420, and the second rotating part 430 under the impact of the external force, reducing deformation of the display 100, and enhancing mechanical strength of the foldable electronic device 1000. Similarly, when the second shielding body 520 or the third shielding body 530 is impacted by the external force, some energy of the impact may be transferred to the first shielding body 510, to disperse the impact force, thereby effectively protecting the display 100. When the foldable electronic device 1000 falls in an unfolded state, the first housing 200 or the second housing 300 is impacted first, and the impact force may be transferred from the first sub-bezel 221 to the second shielding body 520 adjacent to the first sub-bezel 221. Alternatively, the third sub-bezel 321 transfers the impact force to the third shielding body 530, and the second shielding body 520 and the third shielding body 530 transfer a part of the impact force to the first shielding body 510 again, to disperse the impact force, thereby protecting the display 100.

Figure 9:
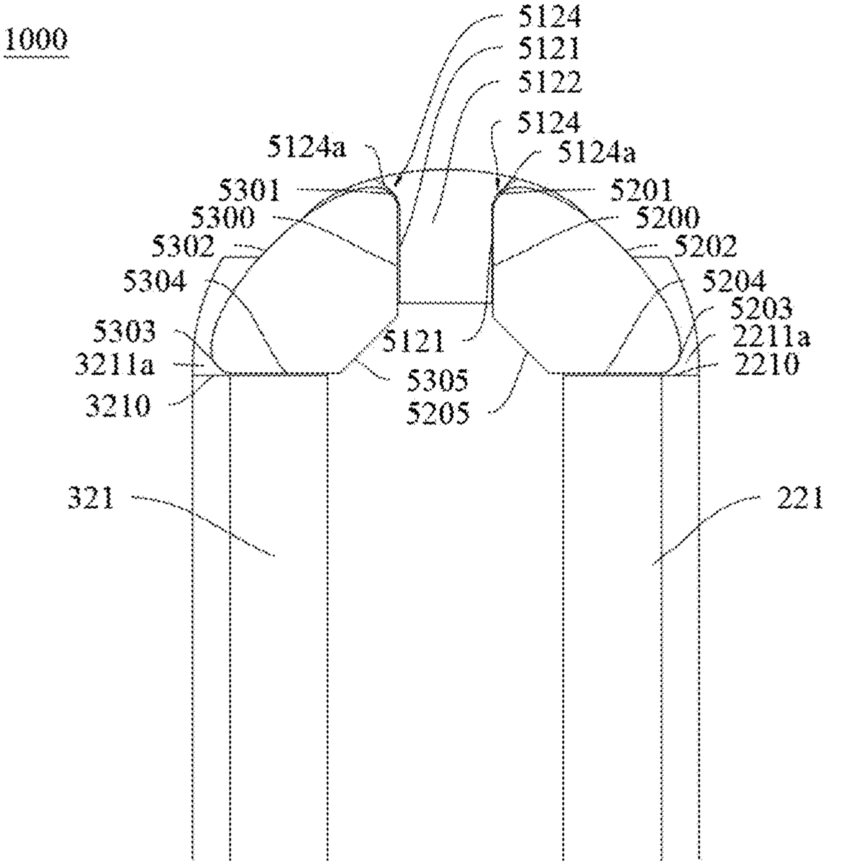
FIG. 9 is a schematic diagram of a structure of a side surface of a foldable electronic device in a folded state according to an embodiment of this application.

Refer to FIG. 9. FIG. 9 is a schematic diagram of a structure of a side surface of the foldable electronic device 1000 in a folded state according to an embodiment of this application. In the folded state of the foldable electronic device 1000, the first end surface 2210 is opposite to the second side surface 5204 and has a gap, a part of the first surface 5206 is opposite to the first inner side surface 2211*a* and has a gap, the first side surface 5200 is opposite to the sliding surface 5121 and has a gap, a part of the first surface 5206 is opposite to the connection surface 5111 of the main shielding body 511, and the first arc-shaped convex surface 5201 is opposite to and has a rotation gap with the concave curved surface 5124*a*. A concave curved surface 5124*a* of the other limiting block 5124 is opposite to and has a rotation gap with the third arc-shaped convex surface 5301, the other sliding surface 5121 is opposite to the third side surface 5300 and has a gap, a part of the third surface 5306 is opposite to a connection surface 5111 of a part of the main shielding body 511, the fourth side surface 5304 is opposite to the second end surface 3210 and has a gap, and a part of the third surface 5306 is spaced opposite to the second inner side surface 3211*a*. It may be understood that the first shielding body 510, the second shielding body 520, and the third shielding body 530 and the first sub-bezel 221 and the second sub-bezel 222 limit each other through face-to-face disposing, so that positions of the first housing 200, the second shielding body 520, the first shielding body 510, the third shielding body 530, and the second housing 300 do not mismove greatly. Therefore, a stable folding state is maintained, and damage to the display 100 caused by a folding angle greater than a preset folding angle can be avoided.

When the foldable electronic device 1000 is impacted in the folded state, the first housing 200, the second shielding body 520, the first shielding body 510, the third shielding body 530, and the second housing 300 may be sequentially in contact with each other for limiting, to disperse an impact payload. Specifically, when the foldable electronic device 1000 is impacted in the folded state, the first end surface 2210 and the second side surface 5204 may abut against each other, so that the first housing 200 and the second shielding body 520 sequentially limit each other. The first side surface 5200 and one sliding surface 5121 are in contact with each other for limiting, and the third side surface 5300 and the other sliding surface 5121 are in contact with each other for limiting, so that the second shielding body 520, the first shielding body 510, and the third shielding body 530 may sequentially abut against each other for limiting. The fourth side surface 5304 and the second end surface 3210 may be in contact with each other for limiting, so that the third shielding body 530 and the second housing 300 may abut against each other for limiting.

It may be understood that, when the foldable electronic device 1000 is in the folded state, when an end part of a foldable part is impacted by a force in a specific direction, gaps sequentially between the first housing 200, the second shielding body 520, the first shielding body 510, the third shielding body 530, and the second housing 300 may provide buffer spaces. In addition, the first housing 200, the second shielding body 520, the first shielding body 510, the third shielding body 530, and the second housing 300 may sequentially abut against each other to disperse an impact payload, to protect a structure of the foldable electronic device 1000.

For example, when the foldable electronic device 1000 is in the folded state, side surfaces of the third surface 5114 of the first shielding body 510, the first top surface 5202 of the second shielding body 520, and the second top surface 5302 of the third shielding body 530 may jointly form an arc profile. The arc profile may make appearances of the first shielding body 510, the second shielding body 520, and the third shielding body 530 more concise, and conform to angles of the first housing 200 and the second housing 300 after the first housing 200 and the second housing 300 rotate through the central shaft assembly 400. It should be noted that, when the foldable electronic device 1000 is in the folded state, angle positioning presented by the first shielding body 510, the second shielding body 520, and the third shielding body 530, and angle limiting presented by the second shielding body 520 and the third shielding body 530 with the first housing 200 and the second housing 300 are implemented through the central shaft assembly 400. In other words, as angle positioning is performed on the first housing 200 and the second housing 300 through the central shaft assembly 400, angles of the first shielding body 510, the second shielding body 520, and the third shielding body 530 are also positioned, thereby ensuring stability of the shielding member 500.

Figure 10:
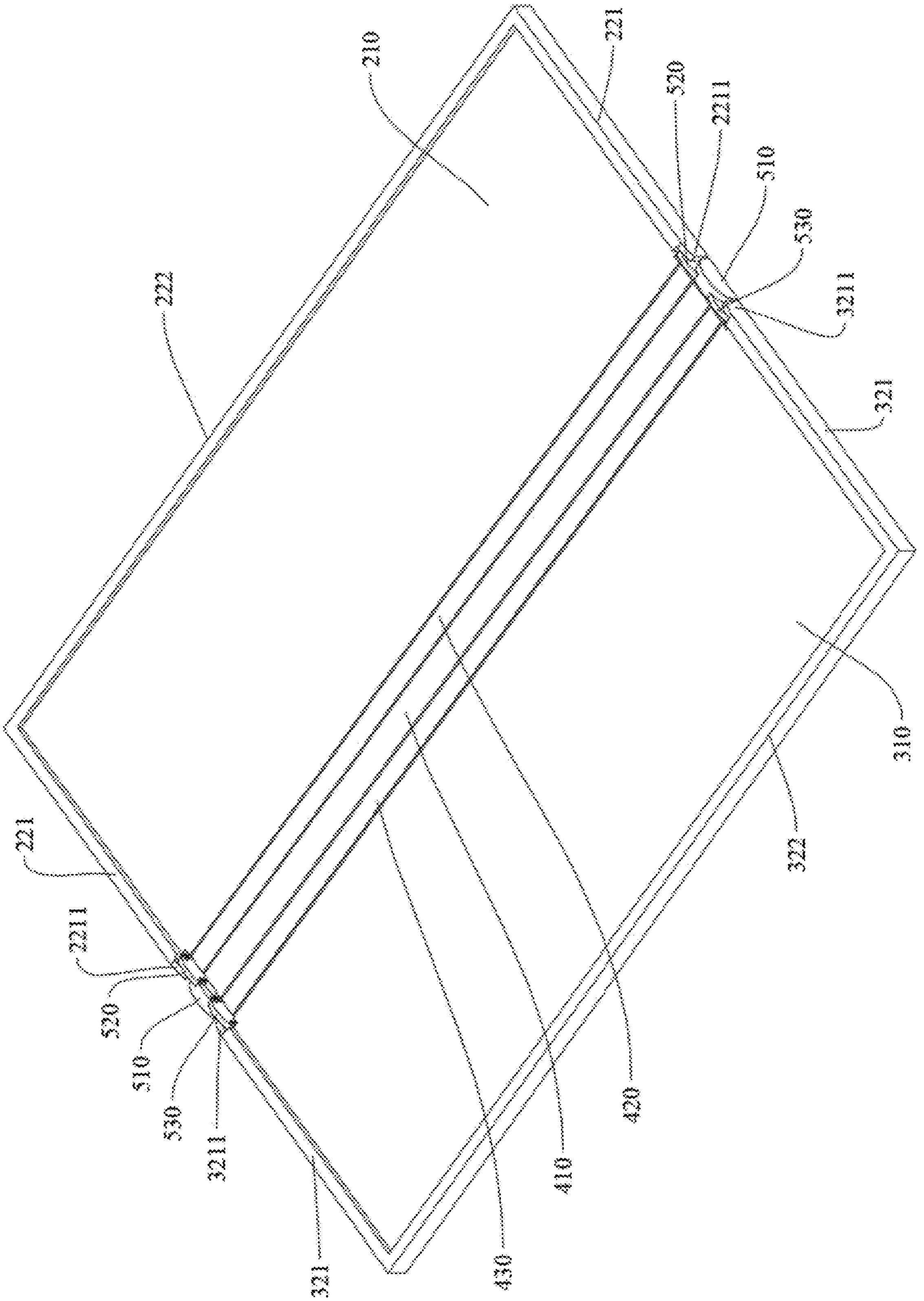
FIG. 10 is a schematic diagram of a structure of another foldable electronic device according to an embodiment of this application.

Refer to FIG. 10. FIG. 10 is a schematic diagram of another example of a structure of the foldable electronic device 1000 according to an embodiment of this application. When the foldable electronic device 1000 is in an unfolded state, the first housing 200 and the second housing 300 are flattened relative to each other, the first housing 200, the second shielding body 520, the first shielding body 510, the third shielding body 530, and the second housing 300 are sequentially arranged in the first direction, and the first shielding body 510, the second shielding body 520, and the third shielding body 530 jointly cover a spacing between the first sub-bezel 221 and the third sub-bezel 321. Specifically, the second shielding body 520 has overlapping parts with both the first shielding body 510 and the first appearance body 2211 of the first sub-bezel 221, so that there are no gaps between the first sub-bezel 221 and the second shielding body 520, and between the second shielding body 520 and the first shielding body 510 in the Y direction. Same as the second shielding body 520, the third shielding body 530 has overlapping parts with both the second appearance body 3211 of the third sub-bezel 321 and the first shielding body 510, so that there are no gaps between the third sub-bezel 321 and the third shielding body 530, and between the third shielding body 530 and the first shielding body 510 in the Y direction, and the internal components are shielded, thereby protecting the internal components and hiding the internal components to make the appearance more concise and beautiful.

Figure 11:
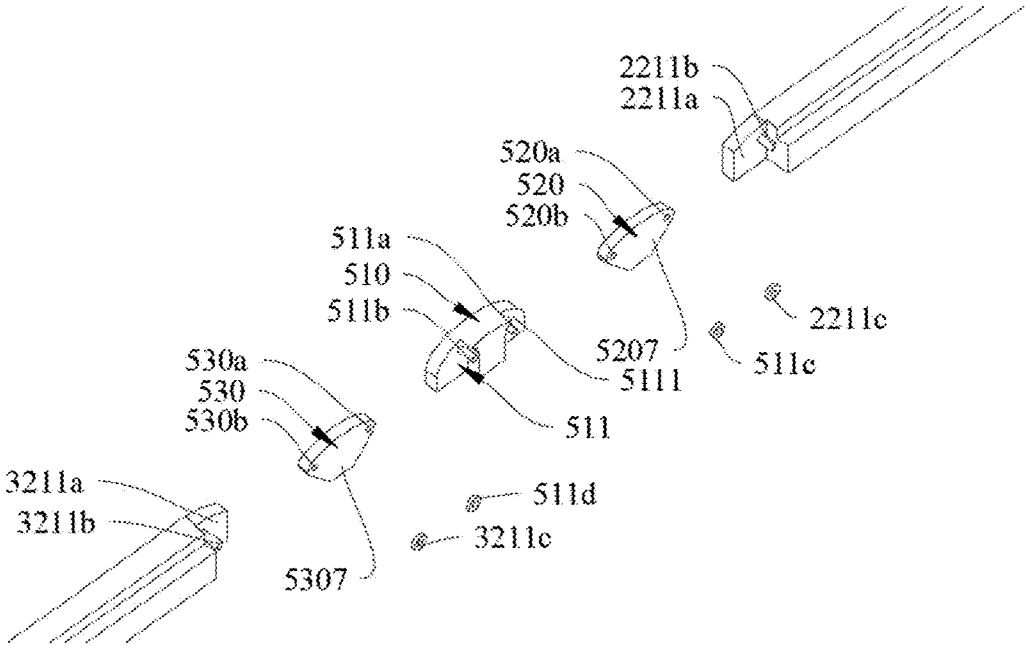
FIG. 11 is a schematic exploded diagram of the foldable electronic device in FIG. 10 in an unfolded state.

Refer to FIG. 11. FIG. 11 is a schematic exploded diagram of the foldable electronic device 1000 in FIG. 10 in an unfolded state. The first shielding body 510 is rotatably connected to the second shielding body 520 and the third shielding body 530 separately through rotating shafts, and both the second shielding body 520 and the third shielding body 530 are rotatably connected to the first housing 200 and the second housing 300 respectively through rotating shafts. The second shielding body 520 is separately connected to the first shielding body 510 and the first housing 200 through rotating shafts, so that a connection manner thereof is stabler, thereby ensuring that the second shielding body 520 rotates more efficiently and stably. The third shielding body 530 is separately connected to the first shielding body 510 and the second housing 300 through cylinders, so that a bonding force between the third shielding body 530 and the first shielding body 510 and a bonding force between the third shielding body 530 and the end part of the second housing 300 can be increased. When an impact occurs, dislocation is not likely to occur, and damage to another structure of the foldable electronic device 1000 is avoided as much as possible.

Specifically, the main shielding body 511 includes a first rotating shaft 511*a* and a second rotating shaft 511*b*, and shaft directions of the first rotating shaft 511*a* and the second rotating shaft 511*b* may be perpendicular to or approximately an angle of a right angle with the main shielding body 511. The first rotating shaft 511*a* and the second rotating shaft 511*b* are convexly disposed on the connection surface 5111 of the first shielding body 510, and axis lines of the first rotating shaft 511*a* and the second rotating shaft 511*b* may be perpendicular to the connection surface 5111. One concave curved surface 5124*a* faces the first rotating shaft 511*a*, and the other concave curved surface 5124*a* faces the second rotating shaft 511*b*.

The second shielding body 520 is provided with a first through hole 520*a* and a second through hole 520*b*. The first through hole 520*a* and the second through hole 520*b* penetrate through the first surface 5206 and the second surface 5207. Each first appearance body 2211 includes a third rotating shaft 2211*b*. The third rotating shaft 2211*b* is convexly disposed on the first inner side surface 2211*a* of the first appearance body 2211. An axis line direction of the third rotating shaft 2211*b* may be perpendicular to the first inner side surface 2211*a*. The third shielding body 530 includes a third through hole 530*a* and a fourth through hole 530*b*. The third through hole 530*a* and the fourth through hole 530*b* penetrate through the third surface 5306 and the fourth surface 5307. Each second appearance body 3211 includes a fourth rotating shaft 3211*b*. The fourth rotating shaft 3211*b* is convexly disposed on the second inner side surface 3211*a* of the second appearance body 3211. An axis line direction of the fourth rotating shaft 3211*b* may be perpendicular to the second inner side surface 3211*a*. The first through hole 520*a* of the second shielding body 520 is connected to the first rotating shaft 511*a*, and the second through hole 520*b* of the second shielding body 520 is connected to the third rotating shaft 2211*b*. The third through hole 530*a* of the third shielding body 530 is connected to the second rotating shaft 511*b*, and the fourth through hole 530*b* is connected to the fourth rotating shaft 3211*b*. When a folding or unfolding action is performed on the foldable electronic device 1000, the first rotating shaft 511*a* may rotate in the first through hole 520*a*, the second rotating shaft 511*b* may rotate in the third through hole 530*a*, the third rotating shaft 2211*b* may rotate in the second through hole 520*b*, and the fourth rotating shaft 3211*b* may rotate in the fourth through hole 530*b*.

The first shielding body 510 may further include a first fastener 511*c* and a second fastener 511*d*. After assembly, a part of the second shielding body 520 is stacked with the first shielding body 510, a part of the second shielding body 520 is stacked with the first appearance body 2211, the first rotating shaft 511*a* penetrates through the first through hole 520*a*, the first fastener 511*c* is connected to an end of the first rotating shaft 511*a*, that is, is located at the second surface 5207. The second shielding body 520 is located between the connection surface 5111 and the first fastener 511*c*. The first rotating shaft 511*a* penetrates through the first through hole 520*a* and is locked through the first fastener 511*c*. In other words, the second shielding body 520 is rotatably connected to the first shielding body 510 and the first sub-bezel 221 separately. The first fastener 511*c* enables the second shielding body 520 to rotate only using an axis line direction of the first rotating shaft 511*a* as a central axis, thereby reducing sliding of the second shielding body 520 in the axis line direction of the first rotating shaft 511*a*. The second fastener 511*d* is connected to an end of the second rotating shaft 511*b*, and the third shielding body 530 is disposed between the connection surface 5111 and the second fastener 511*d*. The second fastener 511*d* enables the third shielding body 530 to rotate only using an axis line direction of the second rotating shaft 511*b* as a central axis, thereby reducing sliding of the third shielding body 530 in the axis line direction of the second rotating shaft 511*b*.

The first appearance body 2211 may include a third fastener 2211*c*. After assembly, the third fastener 2211*c* is connected to an end of the third rotating shaft 2211*b*, the third fastener 2211*c* is located at the second surface 5207, and the second shielding body 520 is disposed between the first inner side surface 2211*a* and the third fastener 2211*c*. The third rotating shaft 2211*b* penetrates through the second through hole 520*b* and is locked through the third fastener 2211*c*. The third fastener 2211*c* enables the second shielding body 520 to rotate only using an axis line direction of the third rotating shaft 2211*b* as a central axis, thereby reducing sliding of the second shielding body 520 in the axis line direction of the third rotating shaft 2211*b*.

The second appearance body 3211 may include a fourth fastener 3211*c*. After assembly, the fourth fastener 3211*c* is connected to an end of the fourth rotating shaft 3211*b*, the fourth fastener is located at the fourth surface 5307, and the third shielding body 530 is disposed between the second inner side surface 3211*a* and the fourth fastener 3211*c*. The fourth rotating shaft 3211*b* penetrates through the fourth through hole 530*b* and is locked through the fourth fastener 3211*c*. The fourth fastener 3211*c* enables the third shielding body 530 to rotate only using an axis line direction of the fourth rotating shaft 3211*b* as a central axis, thereby reducing sliding of the third shielding body 530 in the axis line direction of the fourth rotating shaft 3211*b*.

Figure 12:
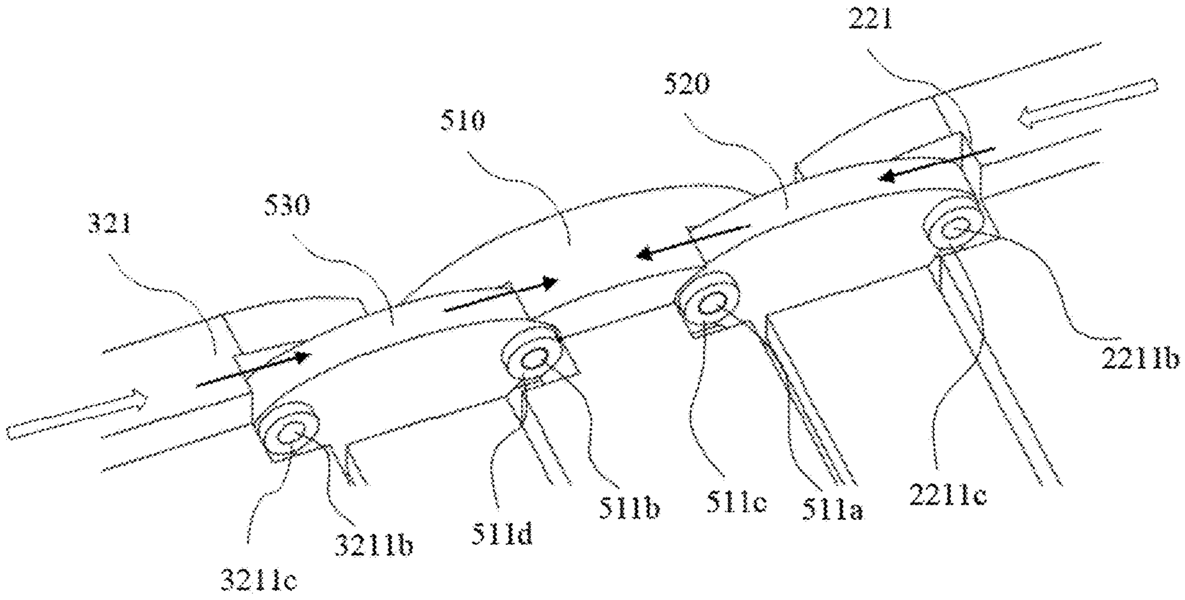
FIG. 12 is a schematic enlarged diagram of a partial structure of the foldable electronic device in FIG. 10 in an unfolded state.

Refer to FIG. 12. FIG. 12 is a schematic enlarged diagram of a partial structure of the foldable electronic device 1000 in FIG. 10 in an unfolded state. The first shielding body 510 is directly connected to the second shielding body 520 through the first rotating shaft 511*a*, and is directly connected to the third shielding body 530 through the second rotating shaft 511*b*. The first appearance body 2211 is directly connected to the second shielding body 520 through the third rotating shaft 2211*b*, and the second appearance body 3211 is directly connected to the third shielding body 530 through the fourth rotating shaft 3211*b*. The second shielding body 520 is separately connected to the first shielding body 510 and the first appearance body 2211 through cylinders, so that a connection manner thereof is stabler, thereby ensuring that the second shielding body 520 rotates more efficiently and stably. The third shielding body 530 is separately connected to the first shielding body 510 and the second appearance body 3211 through cylinders, so that a bonding force between the third shielding body 530 and the first shielding body 510 and a bonding force between the third shielding body 530 and the third sub-bezel 321 can be increased. When an impact occurs, dislocation is not likely to occur, and damage to the display 100 is avoided as much as possible.

In this embodiment, the first shielding body 510 is directly connected to the base 410, the second shielding body 520 is not connected to the first rotating part 420, and the third shielding body 530 is not connected to the second rotating part 430. During assembly, the second shielding body 520 and the third shielding body 530 are assembled after the central shaft assembly 400 is fastened to the first housing 200 and the second housing 300. In other words, after the through holes of the second shielding body 520 and the third shielding body 530 are connected to the cylinders, the fasteners are used to limit the ends of the cylinders, to prevent the second shielding body 520 and the third shielding body 530 from falling off. Because the second shielding body 520 is not directly connected to the first rotating part 420, movement of the second shielding body 520 and the first rotating part 420 does not affect each other. When the second shielding body 520 is impacted by the external force, a motion function of the first rotating part 420 is not affected, thereby reducing the impact of the first rotating part 420 on the display 100 and protecting the display 100. The connection relationship between the third shielding body 530 and the first rotating part 420 is the same as the connection relationship between the second shielding body 520 and the first rotating part 420, and is not described herein again. The first shielding body 510, the second shielding body 520, the third shielding body 530, the first housing 200, and the second housing 300 may form an enclosure frame together to protect the interior of the foldable electronic device 1000. In addition, when the foldable electronic device 1000 falls, a motion action of the central shaft assembly 400 is protected, and an abnormal action of the central shaft assembly 400 is reduced, thereby improving falling reliability of the display 100. The abnormal action, for example, dislocation of the base 410, the first rotating part 420, or the second rotating part 430 causes damage to the display 100.

Embodiments of this application are described in detail above. The principle and implementations of this application are described herein through specific examples. The description about embodiments of this application is merely provided to help understand the method and core ideas of this application. In addition, a person of ordinary skill in the art can make variations and modifications to this application in terms of the specific implementations and application scopes based on the ideas of this application. Therefore, the content of specification shall not be construed as a limit to this application.

The invention claimed is:

1. A foldable electronic device, comprising:

a first housing;

a second housing;

a central shaft assembly; and two shielding members, wherein in a first direction the first housing and the second housing are respectively coupled to two opposite sides of the central shaft assembly, and the central shaft assembly implements relative rotation of the first housing and the second housing, wherein each shielding member comprises a first shielding body, a second shielding body, and a third shielding body, the second shielding body and the third shielding body are located at two opposite sides of the first shielding body, and both the second shielding body and the third shielding body are supported to rotate relative to the first shielding body, wherein in a second direction perpendicular to the first direction the second shielding body is located at a side of the first shielding body facing the central shaft assembly and is partially stacked with the first shielding body, wherein the third shielding body is located at the side of the first shielding body facing the central shaft assembly and is partially stacked with the first shielding body, wherein in the second direction the two shielding members are respectively located at two opposite ends of the central shaft assembly, the first shielding body is coupled to one end part of the central shaft assembly, the second shielding body supported to slide and rotate relative to the first housing, and the third shielding body is supported to slide and rotate relative to the second housing, wherein the first shielding body, the second shielding body, and the third shielding body form a part of an appearance structure of the foldable electronic device, wherein the first shielding body comprises a limiting body, the two opposite sides of the limiting body comprise concave curved surfaces, the second shielding body comprises two arc-shaped convex surfaces that are oppositely disposed, and the third shielding body comprises two arc-shaped convex surfaces that are oppositely disposed, wherein one arc-shaped convex surface of the second shielding body is opposite to and has a rotation gap with a first concave curved surface of the limiting body, wherein a first arc-shaped convex surface of the third shielding body is opposite to and has a rotation gap with a second concave curved surface of the limiting body, and wherein a second arc-shaped convex surface of the second shielding body is spaced opposite to the end surface of the first housing, and a second arc-shaped convex surface of the third shielding body is spaced opposite to the end surface of the second housing.

2. The foldable electronic device according to claim 1, wherein appearance surfaces of the first shielding body, the second shielding body, and the third shielding body jointly form an appearance surface of the appearance structure, the appearance surface of the appearance structure faces a same direction as appearance surfaces of the first housing and the second housing, and the appearance surfaces of the second shielding body and the third shielding body are respectively located in a gap between the first shielding body and the first housing and a gap between the first shielding body and the second housing, wherein in an unfolded state of the foldable electronic device the first housing and the second housing are flattened relative to each other, and the first housing, the second shielding body, the first shielding body, the third shielding body, and the second housing are sequentially arranged in the first direction, and in a folded state of the foldable electronic device the first housing and the second housing oppositely folded, and the second shielding body and the third shielding body separately rotate by a specific angle relative to the first shielding body.

3. The foldable electronic device according to claim 2, wherein for each of the two shielding members the first shielding body comprises a main shielding body and the limiting body that is coupled to the central shaft assembly, the limiting body is convexly disposed on a side surface of the main shielding body, limiting blocks are disposed on two opposite sides of the limiting body, wherein the second shielding body and the third shielding body are respectively located at the two opposite sides of the limiting body, the second shielding body is partially stacked with the main shielding body, and the third shielding body is partially stacked with the first shielding body, and wherein two opposite sides of the second shielding body respectively face and have rotation gaps with a side surface of the limiting body and an end surface of the first housing, and two opposite sides of the third shielding body respectively face and have rotation gaps with the other side surface of the limiting body and an end surface of the second housing.

4. The foldable electronic device according to claim 3, wherein the first shielding body is rotatably coupled to the second shielding body and the third shielding body separately through rotating shafts, and both the second shielding body and the third shielding body are rotatably coupled to the first housing and the second housing respectively through rotating shafts.

5. The foldable electronic device according to claim 3, wherein each limiting body of each first shielding body comprises an arc-shaped end surface and two sliding surfaces that are oppositely disposed, each sliding surface is coupled to one end of the arc-shaped end surface, each limiting block is located at a position of the sliding surface close to the arc-shaped end surface, each limiting block is provided with a concave curved surface, and the concave curved surfaces of said each limiting body are smoothly coupled to two opposite ends of the sliding surface.

6. The foldable electronic device according to claim 5, wherein the first housing comprises a first sub-bezel and a second sub-bezel that are oppositely disposed, the first sub-bezel is provided with a first end surface and a first appearance body convexly disposed on the first end surface, and the second sub-bezel is provided with a second end surface and a second appearance body convexly disposed on the second end surface, wherein in the first direction the first shielding body is located between the first appearance body and the second appearance body, the second shielding body is partially stacked with the first appearance body, and the arc-shaped convex surface of the second shielding body is spaced opposite to the first end surface, the third shielding body is partially stacked with the second appearance body, and the arc-shaped convex surface of the third shielding body is spaced opposite to the second end surface.

7. The foldable electronic device according to claim 6, wherein for each shielding member the second shielding body further comprises a first side surface and a second side surface that are oppositely disposed, and the third shielding body further comprises a third side surface and a fourth side surface that are oppositely disposed, wherein in the folded state of the foldable electronic device the first side surface is spaced opposite to a first sliding surface, the second side surface is spaced opposite to the first end surface, the third side surface is spaced opposite to a second sliding surface, and the fourth side surface is spaced opposite to the second end surface.

8. The foldable electronic device according to claim 7, wherein for each shielding member the two arc-shaped convex surfaces of the second shielding body are a first arc-shaped convex surface and a second arc-shaped convex surface, wherein the second shielding body further comprises a first top surface, a first bottom surface, a first surface, and a second surface; the first side surface, the first arc-shaped convex surface, the first top surface, the second arc-shaped convex surface, the second side surface, and the first bottom surface are sequentially coupled and are all coupled to the first surface and the second surface; the first surface is disposed opposite to the second surface, the first side surface and the second side surface are separately disposed at an included angle relative to the first bottom surface, and the first surface is an appearance surface of the first shielding body, the two arc-shaped convex surfaces of the third shielding body are a third arc-shaped convex surface and a fourth arc-shaped convex surface; the third shielding body further comprises a second top surface, a second bottom surface, a third surface, and a fourth surface; the third side surface, the third arc-shaped convex surface, the second top surface, the fourth arc-shaped convex surface, the fourth side surface, and the second bottom surface are sequentially coupled and are all coupled to the third surface and the fourth surface; the third surface and the fourth surface are oppositely disposed; and the third side surface and the fourth side surface are separately disposed at an included angle relative to the second bottom surface, and the third surface is an appearance surface of the third shielding body.

9. The foldable electronic device according to claim 6, wherein for each shielding member the rotating shafts of the first shielding body are a first rotating shaft and a second rotating shaft, a rotating shaft of the first appearance body is a third rotating shaft, and a rotating shaft of the second appearance body is a fourth rotating shaft, the second shielding body comprises a first through hole and a second through hole, and the third shielding body comprises a third through hole and a fourth through hole; and the first rotating shaft penetrates through the first through hole, the second shielding body rotates relative to the first shielding body through the first rotating shaft, the second rotating shaft penetrates through the third through hole, the third shielding body rotates relative to the first shielding body through the second rotating shaft, the third rotating shaft penetrates through the second through hole, the first housing and the second shielding body rotate through the third rotating shaft, the fourth rotating shaft penetrates through the fourth through hole, and the second housing and the third shielding body rotate through the fourth rotating shaft.

10. The foldable electronic device according to claim 1, wherein the first shielding body, the second shielding body, and the third shielding body are made of metal materials.

11. The foldable electronic device according to claim 1, further comprising a display, wherein the first housing, the second housing, the central shaft assembly, and the shielding members form a main body, the display is stacked with the main body, and the display comprises a first part, a second part, and a third part that couples the first part and the second part; the first housing carries the first part, the second housing carries the second part, and the central shaft assembly supports the third part, and the central shaft assembly drives the third part to bend, and wherein in the folded state of the foldable electronic device the first part and the second part face each other, or the first part and the second part face away from each other.

12. The foldable electronic device according to claim 11, wherein the central shaft assembly comprises a base, a first rotating part, and a second rotating part, the base comprises a first end and a second end, the first rotating part comprises a third end and a fourth end, and the second rotating part comprises a fifth end and a sixth end, and two first shielding bodies are respectively coupled to the first end and the second end, two second shielding bodies are respectively located at the third end and the fourth end, and two third shielding bodies are respectively disposed at the fifth end and the sixth end.

* * * * *